(12) United States Patent
Ilchenko et al.

(10) Patent No.: US 11,788,967 B2
(45) Date of Patent: Oct. 17, 2023

(54) APPARATUS FOR CARRYING OUT RAMAN SPECTROSCOPY

(71) Applicant: DANMARKS TEKNISKE UNIVERSITET, Kgs. Lyngby (DK)

(72) Inventors: Oleksii Ilchenko, Lyngby (DK); Tomas Rindzevicius, Malmo (SE); Anja Boisen, Birkerod (DK); Roman Slipets, Holte (DK)

(73) Assignee: DANMARKS TEKNISKE UNIVERSITET, Kgs. Lyngby (DK)

( * ) Notice: Subject to any disclaimer, the term of this patent is extended or adjusted under 35 U.S.C. 154(b) by 49 days.

(21) Appl. No.: 16/963,679

(22) PCT Filed: Jan. 23, 2019

(86) PCT No.: PCT/DK2019/050027
§ 371 (c)(1),
(2) Date: Jul. 21, 2020

(87) PCT Pub. No.: WO2019/145005
PCT Pub. Date: Aug. 1, 2019

(65) Prior Publication Data
US 2021/0072158 A1 Mar. 11, 2021

(30) Foreign Application Priority Data

Jan. 23, 2018 (DK) .............................. PA201870044
Nov. 20, 2018 (WO) ................ PCT/DK2018/050306
(Continued)

(51) Int. Cl.
*G01J 3/02* (2006.01)
*G01J 3/44* (2006.01)
*G01N 21/65* (2006.01)

(52) U.S. Cl.
CPC ............ *G01N 21/65* (2013.01); *G01J 3/0229* (2013.01); *G01J 3/0297* (2013.01); *G01J 3/44* (2013.01);
(Continued)

(58) Field of Classification Search
None
See application file for complete search history.

(56) References Cited

U.S. PATENT DOCUMENTS 3,519,816 A * 7/1970 Norman ................... G01J 3/427
356/325
3,817,634 A * 6/1974 Barron ..................... G01J 4/04
356/365
(Continued)

FOREIGN PATENT DOCUMENTS

| CN | 107290056 A | 10/2017 | |
|---|---|---|---|
| CN | 107976467 A * | 5/2018 | ............. G01N 21/65 |

(Continued)

OTHER PUBLICATIONS

Montoya et al, "A Homemade Cost Effective Raman Spectrometer with High Performance", *Journal of Laboratory Chemical Education*, 2015, 3(4), pp. 67-75.
(Continued)

*Primary Examiner* — Rufus L Phillips
(74) *Attorney, Agent, or Firm* — Crowell & Moring LLP; John C. Freeman

(57) ABSTRACT

An apparatus for carrying out Raman spectroscopy on a sample includes a light source for providing a beam of excitation radiation, and an optical system including a spectrograph. The spectrograph includes a grating that divides a beam of scattered light into a spectrum of spatially separated wavelength components and to direct a portion of the spectrum to a detector. The spectrograph includes: 1) a
(Continued)

first lens system for focusing the portion of the spectrum onto the detector and 2) a second lens system-configured to provide a focal plane with focal point in the optical path for focusing the beam of excitation radiation and/or the beam of scattered radiation at the focal point. The apparatus including a reference sample arranged in the focal plane, in particular at the focal point, for obtaining a reference spectrum from the reference sample.

14 Claims, 20 Drawing Sheets

(30) Foreign Application Priority Data

Dec. 10, 2018 (DK) .............................. PA201870804
Dec. 21, 2018 (DK) .............................. PA201870852

(52) U.S. Cl.
CPC ................ *G01N 2201/0612* (2013.01); *G01N 2201/0631* (2013.01); *G01N 2201/0633* (2013.01); *G01N 2201/0635* (2013.01)

(56) References Cited

U.S. PATENT DOCUMENTS

| | | | |
|---|---|---|---|
| 5,243,465 A * | 9/1993 | Fein | G02B 27/143 |
| | | | 359/636 |
| 5,956,138 A | 9/1999 | Slater | |
| 6,122,106 A | 9/2000 | Noyes et al. | |
| 6,621,574 B1 * | 9/2003 | Forney | G01N 21/65 |
| | | | 250/252.1 |
| 2003/0026001 A1 | 2/2003 | Heller et al. | |
| 2004/0263843 A1 | 12/2004 | Knopp et al. | |
| 2005/0248758 A1 | 11/2005 | Carron et al. | |
| 2007/0081156 A1 | 4/2007 | Treado et al. | |
| 2007/0145258 A1 | 6/2007 | Nelson et al. | |
| 2009/0122383 A1 * | 5/2009 | Reyes | G01B 9/02051 |
| | | | 359/850 |
| 2009/0153855 A1 * | 6/2009 | Bungo | G01J 3/0237 |
| | | | 356/319 |
| 2011/0273707 A1 * | 11/2011 | Labrecque | G01J 3/02 |
| | | | 29/428 |
| 2012/0081704 A1 | 4/2012 | Morrow et al. | |
| 2012/0120408 A1 * | 5/2012 | Yasuno | A61B 3/1233 |
| | | | 356/479 |
| 2013/0003055 A1 | 1/2013 | Borysow et al. | |
| 2013/0162990 A1 | 6/2013 | Kobayashi et al. | |
| 2014/0226157 A1 | 8/2014 | Dogariu | |
| 2015/0029504 A1 | 1/2015 | Auner et al. | |
| 2015/0085284 A1 | 3/2015 | Auner et al. | |
| 2015/0104860 A1 | 4/2015 | Cunningham | |
| 2016/0109295 A1 | 4/2016 | Wang | |
| 2016/0223400 A1 * | 8/2016 | Carron | G01J 3/0297 |
| 2016/0320306 A1 | 11/2016 | Huffman et al. | |
| 2017/0016770 A1 | 1/2017 | Heussler et al. | |
| 2017/0160200 A1 * | 6/2017 | Mikami | G01N 15/1429 |

FOREIGN PATENT DOCUMENTS

| | | |
|---|---|---|
| DE | 41 26 963 A1 | 2/1992 |
| DE | 699 22 139 T2 | 11/2005 |
| EP | 0 343 018 A2 | 11/1989 |
| TW | M 500248 U | 5/2015 |
| WO | WO 2014/208349 A1 | 12/2014 |
| WO | WO 2015/105831 A1 | 7/2015 |

OTHER PUBLICATIONS

Isaccs, Sivan et al, "Investigation of liquid crystal Fabry-Perot tunable filters: design, fabrication, and polarization independence", *Applied Optics, Optical Society of America*, Oct. 10, 2014, vol. 53, No. 29, pp. H91-H101.
International Search Report dated Jun. 7, 2019 from PCT Priority Application PCT/DK2018/050027 (7 pages).
Written Opinion of the International Search Authority dated Jun. 7, 2019 from PCT Priority Application PCT/DK2018/050027 (15 pages).
International Preliminary Report on Patentability dated Jul. 28, 2020 from PCT Priority Application PCT/DK2018/050027 (16 pages).
PCT/ISA/206 Invitation to Pay Additional Fees and, Where Applicable, Protest Fee with appended Annex to Form PCT/ISA/206 Communication Relating to the Results of the Partial International Search and appended Sheets 1 to 5 of Provisional Opinion Accompanying the Partial Search Result (15 pages in total).
Search Report dated Mar. 15, 2018 from Danish Priority Application No. PA201870044 (4 pages) and appended Search Opinion and Commentary (6 pages) dated Mar. 15, 2018.

* cited by examiner

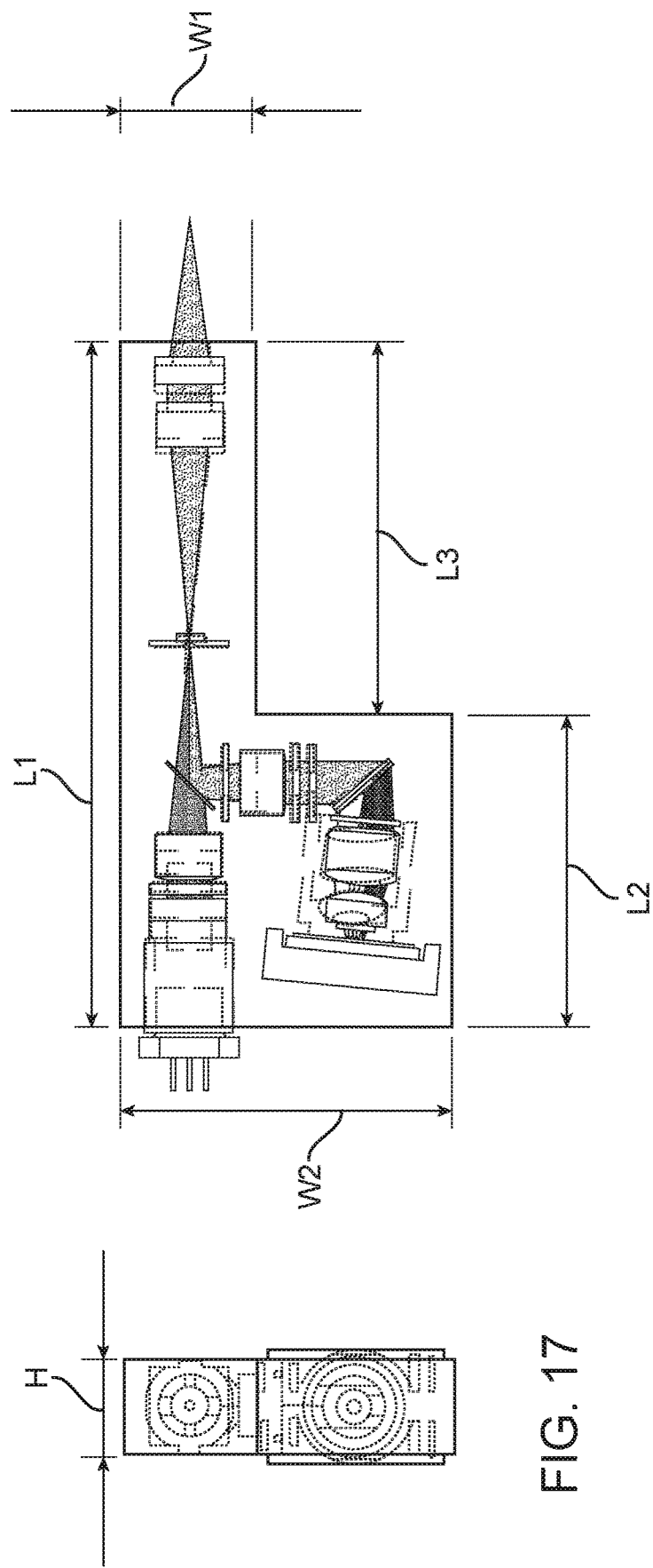

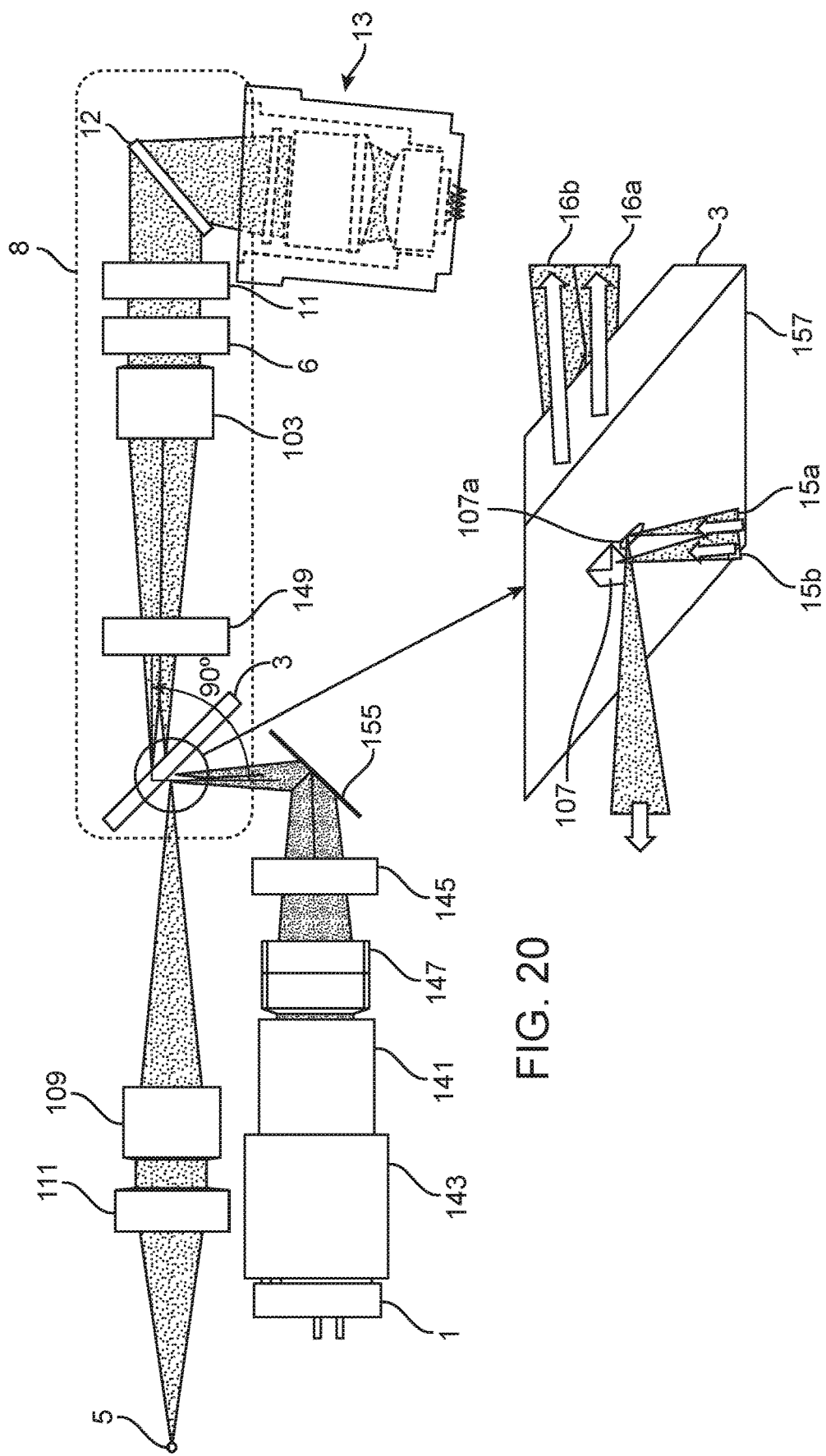

APPARATUS FOR CARRYING OUT RAMAN SPECTROSCOPY

This application is a National Stage application of International Application No. PCT/DK2019/050027, filed Jan. 23, 2019, the entire contents of which are incorporated herein by reference.

This application claims priority under 35 U.S.C. § 119(a) to Danish Patent Application No. PA 2018 70044, filed on Jan. 23, 2018, Danish Patent Application No. PA2018 70804, filed on Dec. 10, 2018, Danish Patent Application No. PA 2018 70852, filed on Dec. 21, 2018, and International Application No. PCT/DK2018/050306, filed on Nov. 20, 2018, the entire contents of each of which are incorporated herein by reference.

BACKGROUND OF THE INVENTION

Field of the Invention

The invention relates to an apparatus for carrying out Raman spectroscopy.

Spectroscopy generally refers to the process of measuring energy or intensity as a function of wavelength in a beam of light. Spectroscopy uses absorption, emission, or scattering of light by physical matter, in particular atoms, molecules or ions, to qualitatively and quantitatively study physical properties and processes of matter.

Description of the Related Art

Light or radiation directed at a sample during operation of a spectrometer system may be referred to as incident radiation. Redirection of incident radiation following contact with the sample is commonly referred to as scattering of radiation. To the extent that atoms or molecules in a sample absorb all or a portion of the incident radiation, rather than reflect incident radiation, a sample may become excited, and the energy level of the sample may be increased to a higher energy level. Light that is scattered but continues to have the same wavelength as the incident radiation will also have the same energy, a condition commonly referred to as Rayleigh or elastically scattered light. Incident radiation that is scattered by the sample during, for example, a change of vibrational state in molecules may be scattered with a different energy, and such scattered light may be called Raman scattered light. Such phenomena have been used in conjunction with spectroscopy to qualitatively and quantitatively study physical properties and processes, including identification of chemical properties, compositions, and structures of samples.

If incident radiation is directed at a sample, the wavelength of the incident radiation may remain substantially unchanged in scattered radiation. Alternatively, if incident radiation is directed at a sample, the wavelength in the scattered radiation may acquire one or more different wavelengths than the incident wavelength. The energy differential between the incident radiation and the scattered radiation may be referred to as a Raman shift. Spectroscopic measurement of Raman scattered light may seek to measure the resulting wavelengths of such scattered light.

The phenomenon of Raman scattered light is useful in spectroscopy applications for studying qualities and quantities of physical properties and processes, including identification of chemical properties, compositions, and structure in a sample. Raman shift spectroscopic analytical techniques are used for qualitative and quantitative studies of samples.

If incident radiation is used to scatter light from a sample, and scattered radiation data is measured, the scattered radiation may provide one or more frequencies associated with the sample, as well as the intensities of those shifted frequencies. The frequencies may be used to identify the chemical composition of a sample.

Raman spectrometers are an example of spectrometers for measuring inelastically scattered light and they are commonly used for obtaining a Raman spectrum of a sample. When a sample is irradiated with monochromatic light, for example from a laser, the light scattered by the sample will contain wavelength components different from those present in the incident light. So-called Raman scattering of light on molecules present in the sample creates this effect. In a Raman spectrometer, the light scattered by the sample is collected and the spectral distribution of the wavelength components having a wavelength different from that of the light source is detected, e.g. in form of a visualized Raman spectrum.

It is an objective of the present invention to provide an apparatus for carrying out Raman spectroscopy that can be manufactured at a low price and that is easy to use and handle.

The object is satisfied by an apparatus for carrying out Raman spectroscopy in accordance with claim 1. Preferred embodiments of the invention are described in the dependent claims.

SUMMARY OF THE INVENTION

In accordance with some embodiments, an apparatus for carrying out Raman spectroscopy on a sample comprises:

a light source for providing a beam of excitation radiation, and an optical system providing an optical light path for directing the beam of excitation radiation to the sample and for directing a beam of scattered light from the sample to a detector, the optical system comprising a spectrograph, the spectrograph comprising a grating, in particular a transmission grating, adapted to divide the beam of scattered light into a spectrum of spatially separated wavelength components and to direct at least a portion of the spectrum to the detector, the spectrograph comprising a first lens system in the light path between the grating and the detector for focusing the portion of the spectrum onto the detector, the optical system comprising at least a second lens system, in particular in the light path between the light source and the sample, and the second lens system being configured to provide at least a first focal point, in particular in a first focal plane, in the optical path for focusing the beam of excitation radiation and/or the beam of scattered radiation at the first focal point, and the apparatus comprising a reference sample arranged in the first focal point, in particular in the first focal plane at the first focal point, for obtaining a reference spectrum from the reference sample.

The apparatus includes a reference sample which allows for the detection of a known Raman spectrum by use of the detector. Therefore, a Raman spectrum measured for the sample can be determined very accurately, since the known Raman spectrum of the reference sample may serve for calibration purposes.

The apparatus can furthermore be constructed in a very compact and cost efficient form. The detector can be a component of the apparatus or can be provided by an external device, for example, by a smartphone. In particular, the camera of a smartphone could be used as a detector of the Raman spectra of the sample and the reference sample. This may also reduce costs, as the apparatus itself does not have to be equipped with a detector.

The second lens system may comprise at least one lens, in particular a focusing lens, which might be arranged in the optical light path between the light source and the sample. The second lens system or the at least one lens of the second lens system may serve to focus the excitation radiation from the light source into the focal plane, in particular at the first focal point, such that the excitation radiation illuminates the reference sample. The reference sample may then scatter Raman scattered lighted whereof a portion might be detected by the detector. A Raman spectrum from the reference sample can thereby be obtained.

A portion of the excitation radiation focused on the reference sample may also be unaffected by the reference sample and travel through the optical system to the sample. The sample may then emit Raman scattered light. A portion of this Raman scattered light might travel through the optical system to the detector where a Raman spectrum of the sample is detected, in particular simultaneous to the detection of the Raman spectrum from the reference sample.

The second lens system may, if, for example, a Wollaston prism is used to split the beam of excitation radiation into two polarized beams, focus one of the beams to a first focal point in the focal plane where the reference sample is placed. The other one of the beams may be focused to another first focal point which is not blocked by the reference sample. This beam may therefore remain unaffected by the reference sample and travel further through the optical system to the sample. The detector can then detect simultaneously Raman spectra from both, the sample and the reference sample.

The optical system may comprise a beam splitting element (it is well known that a beam splitting element is commonly known as a beam splitter), which is configured to be reflective for the beam of excitation radiation and light-transmissive for at least a portion of the beam of scattered light, or light-transmissive for the beam of excitation radiation and reflective for at least a portion of the beam of scattered light. The beam splitting element may for example be an edge filter. This is cheap to produce and simple to manufacture.

The reference sample may be arranged on the beam splitting element, in particular on a surface of the beam splitting element. Thereby, a very compact and cost-efficient optical design can be realized.

The reference sample can be a reference sample coating or a hardened liquid material arranged on the surface of the beam splitting element. The reference sample can thereby be realized in a cost-efficient way.

A slit might be arranged on the surface of the beam splitting element. A classical slit which is used in classical spectrograph is therefore not required. The slit can for example be organized as a mask on the surface of the reference sample. The mask might be a coating arranged on the surface of the reference sample. Thus, in some embodiments, the surface comprises a coating, in particular a metal coating, and the coating forms the slit. The slit can provide one or more apertures through which a focused beam can pass.

The optical system may include a polarization selective element or polarization splitter, for example a Wollaston prism, which is arranged in the optical system for splitting the beam of excitation radiation into two beams of excitation radiation with orthogonal polarization. The polarization selective element or polarization splitter can be arranged between the light source and at least a lens of the second lens system. The two beams of excitation radiation might be used to illuminate the reference sample with one of the beams and the sample with the other one of the beams.

The wording that a component is arranged or placed between two other components as used herein shall not exclude that additional components are also arranged or placed between the two components. Thus, the wording shall not be understood in the sense that only the one component can be arranged between the two other components.

In accordance with some embodiments, an apparatus for carrying out Raman spectroscopy on a sample comprises:

a light source for providing a beam of excitation radiation, and an optical system providing an optical light path for directing the beam of excitation radiation to the sample and for directing a beam of scattered light from the sample to a detector, wherein the optical system comprises a spectrograph, preferably comprising or consisting of a slit, a collimation lens, a grating and/or a focusing lens, wherein the spectrograph comprises a grating, in particular a transmission grating, for example a fused silica transmission grating, adapted to divide the beam of scattered light into a spectrum of spatially separated wavelength components and to direct at least a portion of the spectrum to the detector, wherein the spectrograph comprises a first lens system in the light path between the grating and the detector for focusing the portion of the spectrum onto the detector, wherein the first lens system has a high numerical aperture, wherein the optical system comprises at least a second lens system in the light path between the light source and the sample, and wherein the second lens system has a low numerical aperture.

A polarization selective element, for example a Wollaston prism, can be arranged in the optical system for splitting the beam of excitation radiation into two beams of excitation radiation with orthogonal polarization. At least one of the beams of excitation radiation exiting from the polarization selective element can be regarded as a beam of excitation radiation provided by the light source. Thus, the polarization selective element might be regarded as a component of the light source.

The second lens system may be configured to provide a first focal plane with at least a first focal point in the light path between the light source and the sample and/or in the light path between the sample and the detector.

The second lens system can be arranged in the light path between a light source and a beam splitting element, such as a dichroic beamsplitter or a dichroic mirror or an edge filter, between the light source and the sample, or between the beam splitting element and the detector.

The beam splitting element may be configured to be either reflective for the beam of excitation radiation and light-transmissive for at least a portion of the beam of scattered light, or light-transmissive for the beam of excitation radiation and reflective for at least a portion of the beam of scattered light.

The second lens system can be adapted to transform the beam of scattered light into a collimated beam for illumination of the grating.

The second lens system may be adapted to focus a beam of excitation radiation coming from the light source to a first focal point in the light path between the light source and the sample.

The numerical aperture of the second lens system may be in the range of 0.03 and 0.20, in particular in the range of 0.05 and 0.11.

The ratio between the numerical aperture of the first lens system and the numerical aperture of the second lens system may be in the range between 1.8 and 10, preferably between 2.4-10, further preferably between 4 to 7.

A slit can be arranged in between the second lens system and a third lens system, wherein a focal plane of the second lens system and a focal plane of the third lens system are located, at least approximately, in the slit.

A reference sample can be arranged in at least a portion of the slit.

The optical path of the optical system may be arranged such that at least the light source and the sample can be arranged along a rectilinear optical axis, and/or that the sample and the grating can be arranged along a rectilinear optical axis. The optical components in between the light source and the sample or in between the sample and the grating can as well be arranged along this optical axis.

The optical system may comprise at least a third lens system in the light path between the light source and the sample, the third lens system may have also a low numerical aperture. The numerical aperture of the third lens system may be in the range of 0.03 and 0.20, in particular in the range of 0.05 and 0.11.

A third lens system of the optical system may be arranged in the light path between the second lens system and the sample such that a focal point of the third lens system is located at least approximately at the first focal point.

The optical system comprise a fourth lens system arranged in the optical path between the third lens system and the sample, the fourth lens system being configured to focus the beam on a second focal point which is intended to be on or in the sample.

Each of the first, second, third and fourth lens system may consists of a single lens, in particular a focusing lens, or of a lens system configured to provide a focusing effect. The lens system may comprise a plurality of lenses.

A reference sample is arranged at the first focal point. The reference sample may consist of a small plate of silicon (Si) or of a small plate of a calcium fluoride crystal. The reference sample is thereby arranged in the same optical system used to carry out Raman spectroscopy on the sample. The beam of excitation radiation as well as the beam of scattered light from the sample may travel through the reference sample. The spectrum of the sample and the spectrum of the reference sample can be detected simultaneously on the detector. As the spectrum of the reference sample is known, at least one spectral line of the reference sample can be used to calibrate the detected spectrum of the sample. The spectrum of the sample can thereby be determined with high precision. Furthermore, a frequency drift occurring in the detected spectrum may be compensated.

The optical path in between the second lens system and a third lens system may comprise two mirrors to reflect the beam of excitation radiation traveling towards the sample. The mirrors may be arranged such that the beam of excitation radiation travels through the second lens system in a first direction and through the third lens system in a second direction which is at least approximately antiparallel to the first direction. The optical setup can thereby be made very compact.

A beam splitting element, in particular a dichroic beam splitter, may be arranged between the light source and the second lens system, the beam splitting element being adapted to reflect the beam of excitation radiation incoming from the light source and to direct it toward the second lens system. The beam splitting element may be designed such that the beam of scattered light traveling from the sample in the optical system can pass through the beam splitting element.

The beam splitting element may be arranged in the light path between the second lens system and the spectrograph.

The invention also relates to an apparatus for carrying out Raman spectroscopy on a sample, which comprises:

a light source for providing a beam of excitation radiation, and an optical system providing an optical light path for directing the beam of excitation radiation to the sample and for directing a beam of scattered light from the sample to a detector, the optical system comprising a spectrograph, preferably comprising or consisting of a slit, a collimation lens, a grating and a focusing lens, the spectrograph comprising a grating, in particular a transmission grating, adapted to divide the beam of scattered light into a spectrum of spatially separated wavelength components and to direct at least a portion of the spectrum to the detector, the spectrograph comprising a first lens system in the light path between the grating and the detector for focusing the portion of the spectrum onto the detector, the first lens system having a high numerical aperture, the optical system comprising at least a second lens system, in particular in the light path between the light source and the sample, the second lens system having a low numerical aperture, and the second lens system providing a first focal point in the optical path for focusing the beam of excitation radiation and/or the beam of scattered radiation at the first focal point, and the apparatus comprising a reference sample arranged at the first focal point for obtaining a reference spectrum from the reference sample.

The invention also relates to an apparatus for carrying out Raman spectroscopy on a sample, the apparatus comprises:

a light source for providing a beam of excitation radiation, and an optical system providing an optical light path for directing the beam of excitation radiation to the sample and for directing a beam of scattered light from the sample to a detector, the optical system comprising a spectrograph, the spectrograph comprising a grating, in particular a transmission grating, adapted to divide the beam of scattered light into a spectrum of spatially separated wavelength components and to direct at least a portion of the spectrum to the detector, the spectrograph comprising a first lens system in the light path between the grating and the detector for focusing the portion of the spectrum onto the detector, preferably the first lens system having a high numerical aperture, the optical system comprising at least a second lens system, in particular in the light path between the light source and the sample or in the light path between the sample and the detector, preferably the second lens system having a low numerical aperture, and the second lens system providing a first focal point in the optical path, the first focal point being on a surface of a beam splitting element, the surface comprising a coating, in particular a metal coating, forming a slit in the optical path.

The invention also relates to an apparatus for carrying out Raman spectroscopy on a sample, the apparatus comprises a beam splitting element which has a coating, in particular a metal coating, on one surface, wherein the coating forms an optical slit on the surface of the beam splitting element.

In some embodiments, a portable electronic device, in particular a smartphone or a tablet, comprises:
 a digital camera, and
 an apparatus in accordance with any one of the preceding claims, the apparatus being adapted to be attached to a housing of the portable device such that the digital camera serves as the detector.

The electronic device may be configured to calibrate the portion of the spectrum of the sample detected by the digital camera based on at least one spectral line from a reference sample detected simultaneously.

The electronic device may comprise a display and may be configured to display the calibrated portion of the spectrum on the display.

The apparatus may comprise a housing which has at least in substance the same length and width as the housing of the electronic device.

In some embodiments, an apparatus for carrying out Raman spectroscopy on a sample comprises a light source for providing excitation radiation, an optical system for directing the excitation radiation to the sample and for directing scattered light from the sample to a detector, a housing for the light source and the optical system and preferably also for the sample, the optical system comprising a grating for dividing the scattered light into spatially separated wavelength components and for directing at least a portion of the spatially separated wavelength components to the detector, and the optical system being adapted to direct at least a portion of the spatially separated wavelength components through an aperture of the housing and on the detector, preferably an imaging sensor, in particular an imaging sensor of a digital camera or a smartphone or the like, for detecting the portion of the spatially separated wavelength components of the scattered light.

Due to the housing's aperture and the optical system which directs the portion of the spatially separated wavelength components through the aperture, the detector for detecting the spatially separated wavelength components of the scattered light and thus the Raman spectrum of the sample can be placed at the outside of the housing. Thereby, the detector can be part of the apparatus, but the detector can also be provided by an external electronic device. For example, an imaging sensor, such as a CCD (charged-coupled device) or CMOS (complementary metal-oxide-semiconductor) imaging sensor, of an external device may serve as detector. The external device may be a smartphone, a tablet or a camera, such as a mirrorless interchangeable lens camera (MILC camera) or a digital single-lens reflex camera (DSLR camera). In case of a smartphone or tablet, its integrated camera or photo sensor may be used as imaging sensor.

The external device, such as a smartphone, can be equipped with electric and/or electronic components for reading out the detected data from the detector/imaging sensor and for processing the data. For example, the external device can be equipped with a screen for depicting the Raman spectrum of the sample which is detected via the device's imaging sensor. The ability to use an imaging sensor of an external device helps to keep the costs for the apparatus low, as there is no need to equip the apparatus itself with an imaging sensor and the associated electronics. It may, however, also be an option to provide the apparatus with an imaging sensor and the associated electronics.

The housing may be a single housing in which the light source and the optical system and preferably also the sample are arranged. All components of the apparatus, with the exception of the imaging sensor, may therefore be arranged within the housing. This facilitates the handling of the device and reduces the risk of damages and misalignment. The imaging sensor may be placeable at the outside of the housing and provided by an external device, such as a commercially available camera or a smartphone, tablet, laptop or any other common computing device having a camera and/or imaging sensor.

The housing can have a mount for mounting the imaging sensor and/or an external device which is equipped with the imaging sensor to the housing. The imaging sensor and/or the external device may therefore be fixedly attached to the housing by use of the mount and at a position such that it is ensured that the wavelength components that pass through the aperture will illuminate the imaging sensor. The use of a mount therefore facilitates the use and handling of the apparatus.

The mount may be a standardized mount, preferably of the type of a standard lens mount, such as a bayonet or screw Sony E-mount, Canon EF (EF-S)-mount, Nikon F-mount, Leica L-mount, Pentax K-mount.

The camera is preferably a mirrorless interchangeable lens camera (MILC). Such cameras are commercially available and are fairly common. The apparatus can be sold to users of such cameras without imaging sensor. This may help to keep the apparatus at a low price.

An advantage of using an imaging sensor of a MILC camera for detection of a Raman spectrum is that the MILC camera is equipped with the electronics to process the data taken by the imaging sensor. Moreover, the MILC camera can provide one or more digital images of a detected Raman spectrum to a computer, smartphone, tablet or the like for further processing and/or the camera can output the images on its display. The same applies to a DSLR camera.

The detector, in particular imaging sensor, may be arranged in a separate housing of an external device, which may not be a MILC camera. The housing of this external device may include a standard lens mount such that the apparatus and the external device can be connected with each other via standard lens mounts. The housing of the imaging sensor may be provided with an aperture aligned with the aperture of the housing of the apparatus when the two housings are mounted together. The housing of the external device may further house electronics connected to the imaging sensor which is adapted to process data obtained by the imaging sensor.

The imaging sensor may also be provided by a smartphone or tablet. The imaging sensor may therefore be integrated in the housing of the smartphone. The benefits may be:
 a) no remote connection between computer and device (the smartphone is already working as a computer/data storage/data analyser).
 b) The smartphone imaging sensor is smaller than in a photo-camera and may perfectly fit spectrograph image size which can vary in the range of 1.8-3 mm.

The housing of the apparatus may be provided with a connector or a docking station which can be fixedly attached to the housing of an external electronic device, such as a smartphone, which provides the imaging sensor and preferably comprises a display and a CPU for displaying and processing data obtained via the detector. The docking station of the housing of the apparatus may for example be formed such that the housing of a smartphone can be fixedly arranged, for example via a snap-fit, within the docking station.

The housing of the apparatus can be of a compact form, having at maximum a length of 200 mm, preferably 150 mm, further preferably 120 mm, a width of 100 mm, preferably 90 mm, further preferably 85 mm and a height of 100 mm, preferably 90 mm, further preferably 85 mm. The apparatus can therefore have a compact design which improves the usability and the handling properties of the apparatus.

The grating may be a transmission polarization independent grating. The use of a transmission grating allows a compact design of the optical system of the apparatus. Moreover, the use of a polarization independent grating allows detecting a Raman spectrum which is independent of the polarization of the detected light.

The grating may be provided with 1000 grooves/mm or more, preferably with 1500 grooves/mm or more, further preferably with 1700 grooves/mm or more, further preferably with 2000 grooves/mm or more, still further preferably with 2300 grooves/mm or more. Highly resolved spectra can thereby be achieved. Furthermore, the grating may lead to an increased sensitivity and to a large scale size of the detected Raman spectrum, for example in the centimetre range.

The grating can be made of fused silica. Preferably the fused silica grating has a diffraction efficiency of more than 85% or 92%, in particular in the all measured Raman shift spectral range. The resolution of Raman spectra detected by the apparatus can thereby be further enhanced.

The apparatus can comprise a sample holder for holding the sample. The sample holder may be arranged, at least partially, within the housing. The housing may be provided with a window or an opening for accessing the sample holder. The sample holder may also be completely arranged within the housing.

The sample holder may comprise a rotatable sample wheel for holding a plurality of samples, for example such as powders, liquids, tablets, SERS substrates, at different positions around a rotational axis of the sample wheel. Several samples can therefore be investigated consecutively.

The sample holder may also comprise an accessory for holding the sample. The accessory may be attachable to an external electronic device, such as a smartphone or tablet.

In some embodiments, an apparatus for carrying out Raman spectroscopy on a sample comprises a light source for providing excitation radiation, and an optical system for directing the excitation radiation to the sample and for directing scattered light from the sample to a detector, the optical system comprising a spectrograph, preferably comprising or consisting of a slit, a collimation lens, a grating and a focusing lens, the spectrograph comprising a grating, in particular a transmission grating, adapted to divide the scattered light into spatially separated wavelength components and to direct at least a portion of the spatially separated wavelength components to the detector, and the spectrograph further comprising a high numerical aperture imaging lens arrangement in the light path between the grating and the detector.

The use of a high numerical aperture imaging lens arrangement helps to improve the resolution of the apparatus and leads to an increase of the signal to noise ratio of the signal measured by the detector. The lens arrangement will also be able to collect more light and will thus provide a brighter image. High quality Raman images can therefore be detected.

The term "numerical aperture" as used herein is to be understood in accordance with its "standard" definition as used in most areas of optics, and especially in microscopy. There, the numerical aperture (NA) of an optical system such as an objective lens is defined by $$NA = n \sin \theta,$$

where n is the index of refraction of the medium in which a lens is working (1.00 for air), and $\theta$ is the maximal half-angle of the cone of light that can enter or exit the lens.

As an example, the high numerical aperture imaging lens arrangement may comprise or consist of a lens like a Double-Gauss lens, a Tessar lens or an Ernostar lens.

The high numerical aperture imaging lens arrangement can have an aberration corrected design with regard to at least one of the following: chromatic aberrations, astigmatism, coma, spherical aberrations for the whole range of fields required to cover spectral range of Raman shift. This further improves the quality of the detected spectra.

The high numerical aperture imaging lens arrangement may have a numerical aperture in the range of 0.1-0.5, preferably 0.2-0.5. A good trade-off between high quality Raman images and a compact, cost-effective design can thereby be achieved.

The optical system may comprise a dichroic mirror in the light path between the light source and the sample. The dichroic mirror may act as a beamsplitter and it may therefore also be called dichroic beamsplitter mirror. The dichroic mirror may be designed to act differently on the light from the light source and the Raman scattered light from the sample. For example, the dichroic mirror can be adapted to transmit the excitation radiation from the light source and to reflect scattered light from the sample which is not at the wavelength of the excitation radiation, or vice versa.

The use of a dichroic mirror in the optical system allows operation of the optical set-up in a so called back-scattering arrangement, where the scattered light from the sample which is directed by the optical system to the detector is traveling for some distance in a direction which is opposite to the direction of the excitation radiation directed to the sample. The use of such a back-scattering arrangement provides the advantage that the same lens or lens arrangement used for focusing the excitation radiation on the sample can be employed to collect the scattered light from the sample.

Preferably, the dichroic mirror is a flat mirror.

The light path of the excitation radiation traveling to the sample and the light path of the scattered light traveling from the sample towards the detector may be over some or a specific distance aligned with each other and directed in opposite directions. A so called back-scattering arrangement as mentioned above is therefore possible.

The optical system may comprise a lens arrangement, in particular a microscope objective, in the light path between the light source and the sample, preferably between a dichroic mirror and the sample, for focusing the excitation radiation from the light source onto the sample.

The lens arrangement in the light path between the light source and the sample can have a numerical aperture (NA) in the range of 0.15-0.9. The range is preferably depending on the application for which the apparatus is used. The microscope objective can have a different NA.

The optical system may comprise a collimation lens arranged in the spectrograph light path of the scattered light between a slit, in particular an entrance slit, of the spectrograph and the grating. The light beam of the scattered light entering through the slit into the spectrograph can be made at least in substance parallel by use of the collimation lens. Thus, the collimation lens may produce a collimated beam incident on the grating.

The ratio between the numerical aperture of the high numerical aperture imaging lens arrangement and the numerical aperture of the collimation lens may be in the range between 1.8 and 10, preferably between 2.4-10, further preferably between 4 to 7. This may lead to a stigmatism-free and aberration-free design and an easier configuration of the Raman probe optics.

The collimation lens may have a low numerical aperture, preferably in the range of 0.03-0.20, in particular 0.05-0.11. This may lead to an aberration corrected design of the collimating lens at a small number of elements. It may be an achromat doublets pair that forms the collimation lens.

It may be advantageous to employ a collimation lens with a low numerical aperture as well as a lens arrangement with a high numerical aperture in the light path between the grating and the detector. Such an arrangement may in particular improve the sensitivity of the detected Raman spectra and result in a better signal-to-noise ratio in the detected Raman spectra. This may become possible due to the fact that negative spectrograph magnification leads to the decreased size of image on sensor pixel. In such way more Raman energy can be compressed into a single pixel.

The apparatus may comprise at least one lens for focusing the scattered light through the slit of the spectrograph. The lens, which may be a so-called slit lens and designed as a focusing lens, may be placed in the optical set-up in such a way that its focal point lies in the slit or at least in the vicinity of the slit of the spectrograph. The NA of the slit lens may be the same as the NA of the collimation lens.

The apparatus may comprise at least one optical filter, in particular an interference filter, an edge filter and/or a notch filter. The filter may for example be adapted to block light from the excitation source while the Raman scattered light from the sample can pass through the filter.

In some embodiments, an apparatus for carrying out Raman spectroscopy on a sample comprises a light source for providing excitation radiation, an optical system for directing the excitation radiation to the sample and for directing scattered light from the sample to a detector, the spectrograph comprising a grating for dividing the scattered light into spatially separated wavelength components and for directing at least a portion of the spatially separated wavelength components to the detector, the grating being a polarization independent transmission grating. The apparatus can be built in a compact design at low costs.

The transmission grating may be made of fused silica, preferably with a diffraction efficiency of more than 85% or 92% in a collected spectral range of the Raman shift.

The light source is preferably a laser or a laser diode, in particular adapted to emit laser light at or in the vicinity of one of the following wavelengths: 405, 445, 532, 633, 658, 660, 680, 785 nm.

In some embodiments, an apparatus for carrying out Raman spectroscopy on a sample comprises a light source for providing excitation radiation, an optical system for directing a portion of the excitation radiation to the sample and for directing scattered light from the sample via a spectrograph to a detector, and the optical system being further adapted to direct a portion of the excitation radiation to a calibration sample and for directing the scattered light from the calibration sample via the spectrograph to the detector.

The apparatus may therefore simultaneously detect the Raman spectrum, or more specifically spectral data associated with the Raman spectrum, of the sample as well as of the calibration sample on the detector. The Raman spectrum of the calibration sample may be known, and spectral data of the calibration sample may be used to calibrate the detector and thus to more precisely identify the Raman spectrum of the sample.

The simultaneous detection of a known Raman spectrum from the calibration sample and of a Raman spectrum from the sample allows for a calibration of the apparatus and for a precise determination of the sample's Raman spectrum. Moreover, the requirements on the light source with regard to for example stability and wavelength drift etc. can be lowered, and thus low cost, low size lasers can be used as excitation source.

The optical system and/or the set-up of the spectrograph can be such that the spectral components of the light provided by the calibration sample and the spectral components of the light provided by the sample arrive at different sections of the detector, so that they do not overlap.

The apparatus may comprise a calibration module which is operatively connected to the detector and configured to determine the Raman spectrum of the sample from the spectral data provided by the detector for the sample and in dependence on the Raman spectral data provided by the detector for the calibration sample. The calibration module can therefore determine, preferably in real-time, the Raman spectrum of the sample making use of the simultaneously detected Raman spectrum of the calibration sample.

Simultaneous measurements of two Raman spectra on the imaging sensor become possible due to the imaging capabilities of the aberration corrected spectrograph design.

In some embodiments, an apparatus for carrying out Raman spectroscopy on a sample comprises a light source for providing excitation radiation, an optical system for directing the excitation radiation to the sample and for directing scattered light from the sample to a detector, a housing for the light source and the optical system and preferably also for the sample, the optical system comprising a grating for dividing the scattered light into spatially separated wavelength components and for directing at least a portion of the spatially separated wavelength components to the detector, the detector being an imaging sensor of an electronic device, preferably a smartphone or a tablet, having a display and a CPU for processing and visualizing data received from the detector, and/or the housing being a single housing in which the light source, the optical system, the electronic device and preferably the sample are arranged or encapsulated.

The light source may be electrically connected to the electric system of the external device. The display of the external device may be incorporated in the housing, so that it is visible at the outside.

The housing may in substance be based on the housing of the external device, which may be extended such that the elements of the apparatus, in particular the light source and the optical system, can be arranged within the housing. Thus the apparatus for carrying out Raman spectroscopy may be integrated in the housing of an electronic device such as a smartphone or a tablet. The electronic device may thereby be monolithically combined with the apparatus for carrying out Raman spectroscopy.

In this regard, the invention may also relate to an electronic device, in particular a smartphone or a tablet, having a display and a CPU and an apparatus for carrying out Raman spectroscopy as described herein.

Preferably, in a smartphone or tablet, an infrared filter (IR-filter) arranged in front of the imaging sensor of the device's camera is removed in order to extend the spectral range for the Raman spectroscopy to the infrared.

The invention also relates to a system for analysing a Raman spectrum comprising: an apparatus for carrying out Raman spectroscopy on a sample, a detector, such as an imaging sensor, preferably mounted or attached to the apparatus, for detecting a portion of the spatially separated wavelength components of the scattered light from the sample, an electronic device, preferably a smartphone, a computer, a laptop or a tablet, being operatively connected, preferably by a wired or wireless connection, to the detector, the electronic device being adapted to receive or read out data associated with the detected spatially separated wavelength components, the electronic device having a storage on which reference spectra of a plurality of materials are stored or having access to such reference spectra, and, preferably, the electronic device being adapted to determine whether the detected spatially separated wavelength components of the scattered light matches with one of the reference spectra.

The electronic device may be adapted to output information associated with the sample if the detected spatially separated wavelength components of the scattered light matches with one of the reference spectra. The information may include the name of the sample. The detector may be provided by the electronic device.

The electronic device may comprise a housing with a compartment configured to receive the apparatus.

The sample is preferably not part of the claimed apparatus or device.

The invention also relates to an apparatus for carrying out Raman spectroscopy on a sample, the apparatus comprising:
a light source for providing a beam of excitation radiation, and
an optical system providing an optical light path for directing the beam of excitation radiation to the sample and for directing a beam of scattered light from the sample to a detector,
the optical system comprising a spectrograph,
the spectrograph comprising a grating, in particular a transmission grating, adapted to divide the beam of scattered light into a spectrum of spatially separated wavelength components and to direct at least a portion of the spectrum to the detector,
the optical system comprising a beam splitting element, in particular for separating the beam of excitation radiation from Raman scattered light,
the beam splitting element comprising, in particular on a surface of the beam splitting element, at least one of the following:
a reference sample which is illuminated by a portion of the beam of excitation radiation for obtaining a Raman spectrum of the reference sample,
a slit, in particular for the spectrograph.

The slit can be formed by at least one aperture in a coating, in particular a metallic coating, arranged on the surface of the beam splitting element.

The optical system can be configured to provide at least a portion of the Raman scattered light from the reference sample to the spectrograph and further to the detector.

A second coating might be formed on the surface, in particular in between the surface and the coating for the slit. The second coating might provide the functionality of an edge filter.

The surface of the beam splitting element can be a plane surface which might face the incident beam of excitation radiation.

The beam splitting element might be configured to be reflective for the beam of excitation radiation and light-transmissive for at least a portion of the beam of scattered light, or light-transmissive for the beam of excitation radiation and reflective for at least a portion of the beam of scattered light.

A feature mentioned herein in conjunction with one embodiment can also be present in other embodiments.

BRIEF DESCRIPTION OF THE DRAWINGS

The invention will be described in the following with reference to embodiments shown in the accompanying drawings and by way of example only. In the drawings there is schematically shown.

DETAILED DESCRIPTION OF THE EMBODIMENTS

Figure 1:
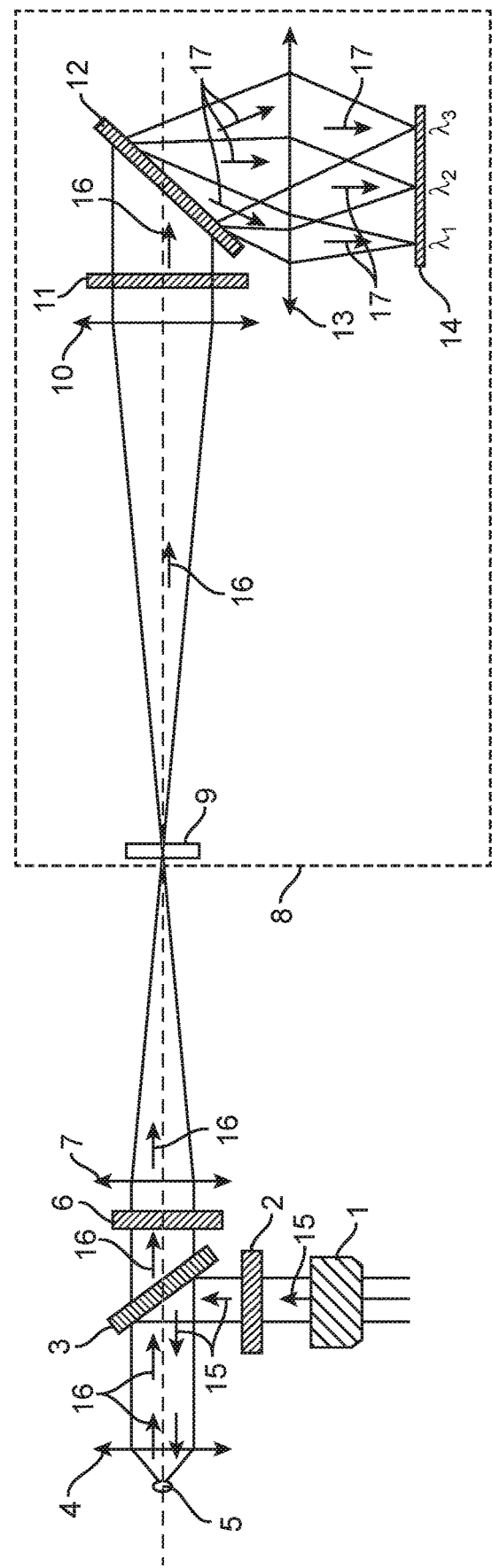
FIG. 1 a schematic optical set-up of a first embodiment of an apparatus for carrying out Raman spectroscopy in accordance with the present invention, FIG. 2 a schematic optical set-up of a second embodiment of an apparatus for carrying out Raman spectroscopy in accordance with the present invention, FIG. 3 a schematic perspective view of a third embodiment of an apparatus for carrying out Raman spectroscopy in accordance with the present invention, FIG. 4 a schematic perspective view of a fourth embodiment of an apparatus for carrying out Raman spectroscopy in accordance with the present invention, FIG. 5 a schematic perspective view of an embodiment of a system for analysing a Raman spectrum in accordance with the present invention, FIG. 6 a schematic perspective view of another embodiment of a system for analysing a Raman spectrum in accordance with the present invention, FIG. 7 a schematic optical set-up of a fifth embodiment of an apparatus for carrying out Raman spectroscopy in accordance with the present invention, FIG. 8 a schematic view of an example of a high numerical aperture imaging lens arrangement usable in the light path of a spectrograph between the grating and the detector, FIG. 9 a schematic view of a second example of a high numerical aperture imaging lens arrangement, FIG. 10 a schematic optical set-up of a sixth embodiment of an apparatus for carrying out Raman spectroscopy in accordance with the present invention, FIG. 11 the apparatus of FIG. 10 in a housing, FIG. 12 a perspective view of a smartphone used in conjunction with the apparatus of FIG. 11, FIG. 13 a diagram of various Raman spectra obtained by use of the smartphone and apparatus as shown in FIG. 12, FIG. 14 a schematic optical set-up of a seventh embodiment of an apparatus for carrying out Raman spectroscopy in accordance with the present invention, FIG. 15 a schematic optical set-up of an eighth embodiment of an apparatus for carrying out Raman spectroscopy in accordance with the present invention, FIG. 16 a perspective schematic view of the apparatus of FIG. 15, FIG. 17 a schematic cross-sectional view of the apparatus of FIG. 15, FIG. 18 a further schematic cross-sectional view of the apparatus of FIG. 15, FIG. 19 a schematic view on the backside of a smartphone having a housing with a compartment in which the apparatus of FIG. 15 is arranged, FIG. 20 a schematic optical set-up of a ninth embodiment of an apparatus for carrying out Raman spectroscopy in accordance with the present invention, FIG. 21 an enlarged view of the dichroic beam splitter region of the apparatus of FIG. 20, FIG. 22 a schematic optical set-up of a tenth embodiment of an apparatus for carrying out Raman spectroscopy in accordance with the present invention, FIG. 23 a perspective view on a portion of the apparatus of FIG. 22.

The apparatus having the optical set-up of FIG. 1 comprises a light source 1 for providing excitation radiation to illuminate a sample 5. The light source 1 is preferably a laser based on laser diode or diode pumped solid state (DPSS) laser technology. The light emitted by the laser 1 is usually collimated.

This collimated light beam passes through interference filter 2. An interference filter is also called dichroic filter and such optical filter reflects one or more spectral bands or lines and transmits others. The interference filter 2 can be designed such as to filter the output of the laser 1, for example in order to remove spurious emissions from the laser 1. The collimated laser beam 15 which has passed through the interference filter 2 is reflected by a dichroic beamsplitter mirror 3 and directed by means of an objective 4 onto a sample 5. The objective 4, which can for example be a biconvex or plano-convex lens, is a focusing lens which focusses the collimated laser beam 15 to a spot at the inside or the surface of the sample 5.

The laser beam 15 induces or generates on contact with the sample 5 scattered radiation having wavelengths different from the incident radiation. Thus the scattered light may have a Raman shift in the wavelengths. The set-up of FIG. 1 is designed such as to have a 180-degree back-scatter geometry, so that the scattered light 16 from the sample 5 which is traveling in a direction which is opposite to the direction of the incoming laser beam 15 is collimated by the objective 4 and further traveling through the dichroic beamsplitter mirror 3 and a first edge filter 6.

The first edge filter 6 may be designed such as to remove undesired radiation, e.g. from laser 1 or another source. The first edge filter 6 may also be designed to reject elastically scattered radiation from the scattered light.

Following the first edge filter 6 the set-up of FIG. 1 comprises a slit lens 7 which is a focusing lens. The focal point of the slit lens 7 is lying in an aperture formed by slit 9 of spectrograph 8 which further comprises a collimation lens 10, a second edge filter 11, a transmission grating 12, a focusing lens 13 and an imaging sensor 14.

As illustrated in FIG. 1, the focal point of the collimation lens 10 is arranged such that it lies in the aperture of slit 9. The collimation lens 10 produces a collimated beam of the scattered light 16 and directs the collimated light beam towards the second edge filter 11 and the transmission grating 12.

The transmission grating 12 divides the light into spatially separated wavelength components 17 and directs at least a portion of the spatially separated wavelength components 17 via the focusing lens 13 to the imaging sensor 14. Thus, the transmission grating 12 disperses the Raman scattered light into its spectrum, and the imaging sensor 14 serves to detect the Raman spectrum emitted by sample 5.

The focusing lens 13 arranged between the transmission grating 12 and the imaging sensor 14 focuses the spatially separated wavelength components 17 of the divided Raman scattered light beam 16 onto the imaging sensor 14 which may be a CMOS or charge-coupled device (CCD) array and which may be connected to electronic equipment that is adapted to visualize the detected optical signal and to display the detected Raman spectrum.

In view of the above, the apparatus in accordance with FIG. 1 comprises a light source, in form of laser 1, for providing excitation radiation, and an optical system for directing the excitation radiation to the sample 5 and for directing scattered light from the sample 5 to a detector formed by the imaging sensor 14. The optical system comprises the spectrograph 8 having the slit 9, the collimation lens 10, the grating 11 and the focusing lens 13. The grating 12 is adapted to divide the scattered light 16 coming from the sample into spatially separated wavelength components 17 and to direct at least a portion of the spatially separated wavelength components 17 to the imaging sensor 14.

The grating 12 is a transmission grating which may not be sensitive on the polarization of the light passing through the grating. Thus, the diffraction grating 12 may preferably be a polarization-independent transmission grating. The grating 12 may be provided with a high number of grooves per millimetre (mm), with preferably 1700 grooves/mm for 785 nm laser source and 2500 grooves/mm for 532 nm laser source. This improves the sensitivity of the spectrograph and may further lead to spectra in the centimetre range that can be detected via the imaging sensor 14. The diffraction grating is preferably made of fused silica, and has a diffraction efficiency of more than 85% over the relevant spectral range.

The spectrograph 8 further comprises an imaging lens arrangement, here in form of the focusing lens 13, in the light path between the grating 11 and the detector 14. The focusing lens 13 has a high numerical aperture (NA), which is preferably in the range between 0.16 and 0.3, which enhances the resolution of the spatially separated wavelengths components 17 on the imaging sensor 14.

The imaging lens arrangement may in addition to or instead of the focusing lens 13 comprise at least another optical element, such as a Double-Gauss lens, a Tessar lens or an Ernostar lens (not shown).

The imaging lens arrangement, corresponding in the example of FIG. 1 to the focusing lens 13, can be designed to have an aberration corrected design with regard to chromatic aberrations, astigmatism, coma and spherical aberrations, in particular for the whole range of fields required to cover the spectral range of Raman shift.

The collimation lens 10 has preferably a low numerical aperture, preferably in the range of 0.03 to 0.20 and further preferably in the range of 0.05 to 0.11.

The optical system of the set-up shown in FIG. 1 further comprises the objective 4, the interference filter 2, the beamsplitter 3, the edge filters 6 and 11, and the slit lens 7. The objective 4 may consist of a lens arrangement with at least one focusing lens, and may for example be a microscope objective. The objective 4 may have a numerical aperture in the range of 0.15 to 0.9.

The optical set-up as shown in FIG. 1 may be arranged in a single housing (not shown). With the exception of the imaging sensor 14, all components of the set-up may also be arranged in a single housing, while the imaging sensor 14 is placed at the outside of the housing (not shown). The housing can be provided with an aperture (see aperture 30 in FIG. 2) through which the spatially separated wavelength components 17 of the scattered light can be directed to the outside of the housing and onto the imaging sensor 14. This has the advantage that the imaging sensor 14 can be provided by an external device, for example a MILC camera.

The housing may have a mount for mounting the housing to a MILC camera in such a way that the camera's imaging sensor is sitting behind the aperture. The mount may be a standardized lens mount, so that the housing can be mounted to the MILC camera in the same way as a zoom lens is mounted to a MILC camera.

The housing can be realized in a compact form. For example, the housing may have, at maximum, a length of 200 mm, a width of 100 mm and a height of 100 mm. Thus, a MILC camera with the housing mounted thereto can be portable.

Figure 2:
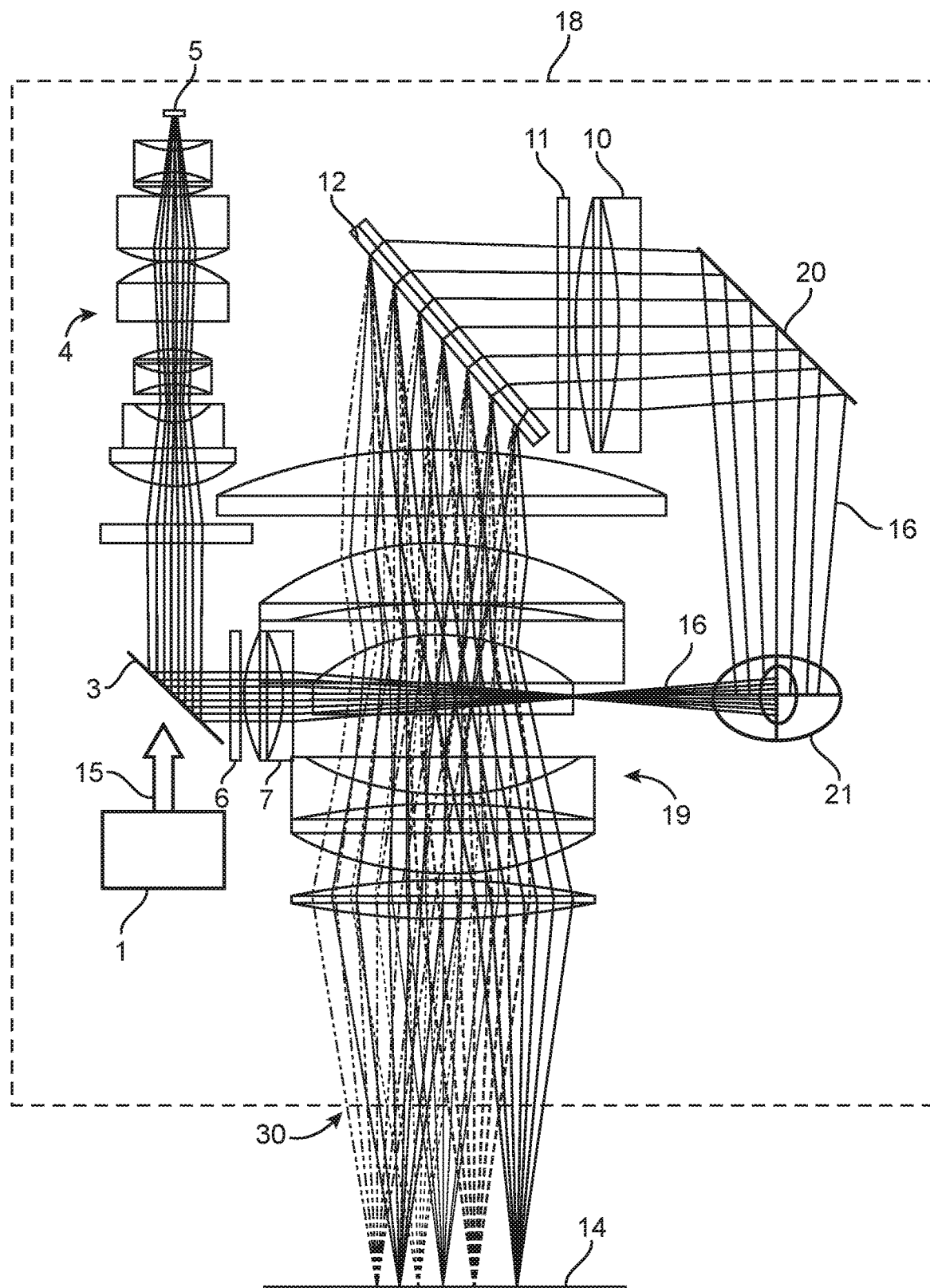

In the optical set-up of FIG. 2, the dichroic mirror 3 is designed to let the laser beam 15 emitted by the laser 1 pass through while it reflects the Raman scattered light which is back scattered from the sample 5. The lens arrangement 4, which can be a microscope objective, comprises a plurality of lenses, and it is designed to focus the collimated laser beam 15 from the laser on a spot in the sample 5.

The scattered light 16 from the sample 5 which is traveling in a direction which is opposite to the direction of the incoming laser beam 15 is collimated by the lens arrangement 4 and reflected by the dichroic mirror 3. The scattered light 16 is further traveling through the first edge filter 6 and the lens 7 which focuses the scattered light 16 and directs it on a mirror 21 from which it is directed to a further mirror 20 which directs the scattered light 16 towards the collimating lens 10 and the second edge filter 11 and through the grating 12.

The transmission grating 12 divides the Raman scattered light 16 into its spatially separated wavelength components 17 and directs at least a portion of this spatially separated wavelength components 17 via a lens arrangement 19 to the imaging sensor 14. The lens arrangement 19 has a focusing effect on the spatially separated wavelength components 17 of the divided Raman scattered light beam 16 and thus contributes to the generation of a spectrally resolved high resolution Raman spectrum of the scattered light which is detected via the imaging sensor 14. The lens arrangement 19 can consist of or comprise a Double-Gauss lens, a Tessar lens or an Ernostar lens.

The design and in particular the numerical apertures of the optical elements 4, 7, 19 can be in the same range as specified above for the corresponding elements 4, 7 and 13 of the set-up of FIG. 1. Thus, the set-up of FIG. 2 can also be employed to generate high-resolution images of Raman spectra of samples 5.

The apparatus having the optical set-up of FIG. 2 can include a housing 18. The imaging sensor 14 is arranged at the outside of the housing 18 and behind an aperture 30 in the housing 18. Thereby, the imaging sensor 14 can be provided by an external device such as a MILC camera to which the housing 18 can be mounted by use of a standardized connector or mount, for example in the same way as a commercially available camera lens can be mounted to a MILC camera.

Figure 3:
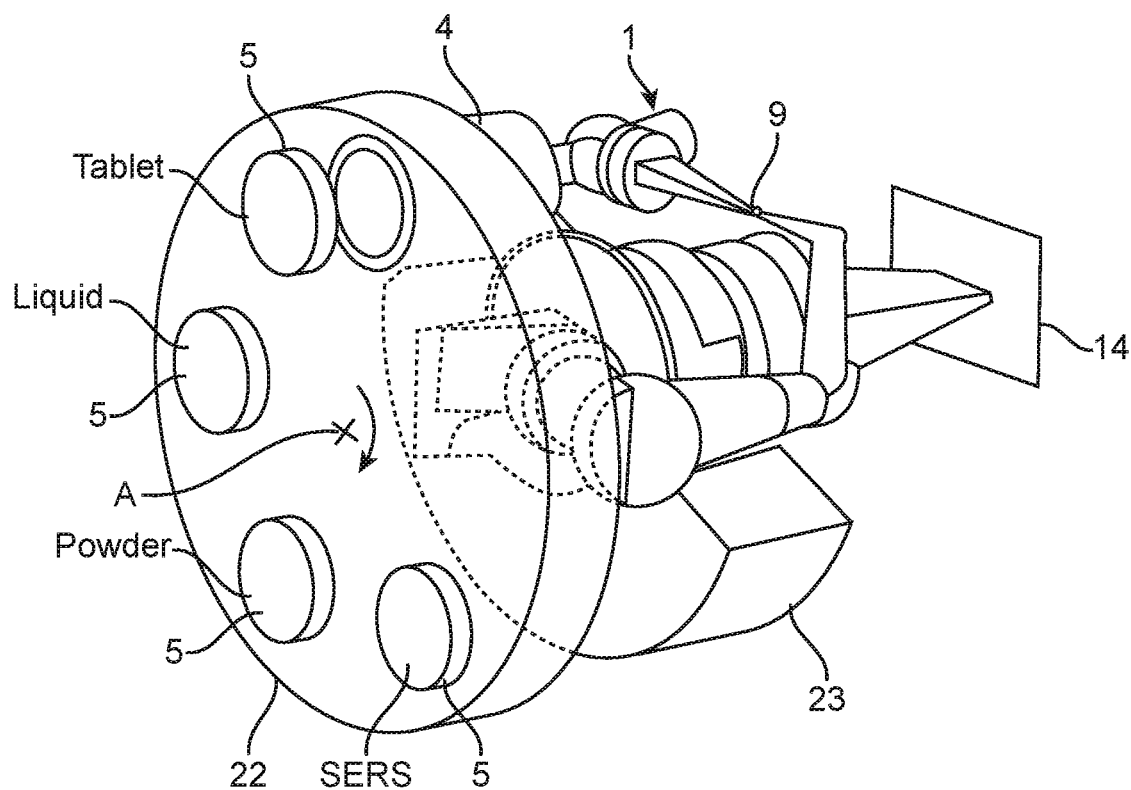

FIG. 3 schematically shows a perspective view of a third embodiment of an apparatus for carrying out Raman spectroscopy. The housing is not shown, and the optical set-up can be as described above with regard to FIGS. 1 and 2.

As shown in FIG. 3, the apparatus comprises a sample wheel 22 which holds a plurality of samples 5 at different positions around a rotational axis A of the sample wheel 22.

The sample 5 at the top of the wheel 22 is exposed to light from the laser 1 which is focused by the objective 4. The sample wheel 22 can be turned around the axis A, so that all samples 5 can be investigated consecutively.

The apparatus of FIG. 3 further comprises electronics 23. The electronics 23 may be configured to turn the sample wheel 22 in a step-wise manner. The electronics 23 may also be configured to steer one or more components of the optical set-up.

Figure 4:
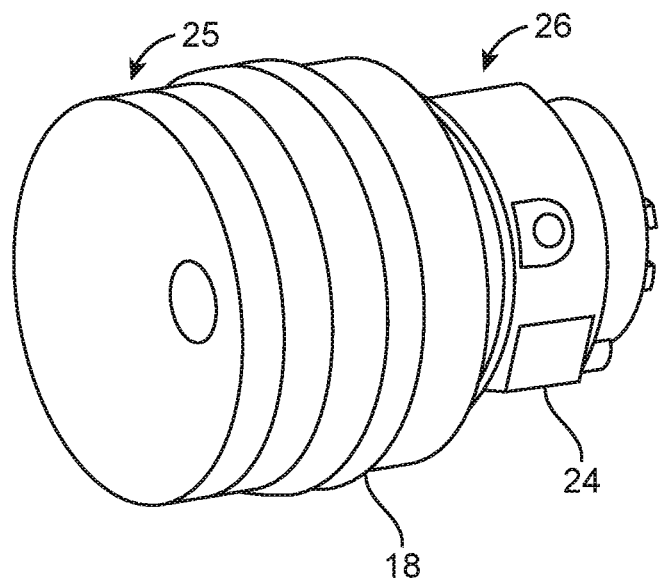

FIG. 4 schematically shows a perspective view of a fourth embodiment of an apparatus 25 for carrying out Raman spectroscopy. The components of the apparatus 25 are placed at the inside of the housing 18 as described above with respect to FIGS. 1 and 2.

The housing 18 comprises an aperture and a mount to which a housing 24 of an external device 26 is attached. The external device 26 includes an imaging sensor, see imaging sensor 14 in FIGS. 1-3, which is arranged in the housing 24. The optical set-up of the apparatus 25 is adapted to direct a portion of the spatially separated wavelengths components through the aperture and on the imaging sensor of the external device 26. Thereby, the imaging sensor of the external device 26 can be used as detector for the incident wavelength components and thus for the Raman spectrum of the sample under investigation. The system comprising the apparatus 25 and the external device 26 has a compact form, as indicated in FIG. 4, and may therefore be portable.

Figure 5:
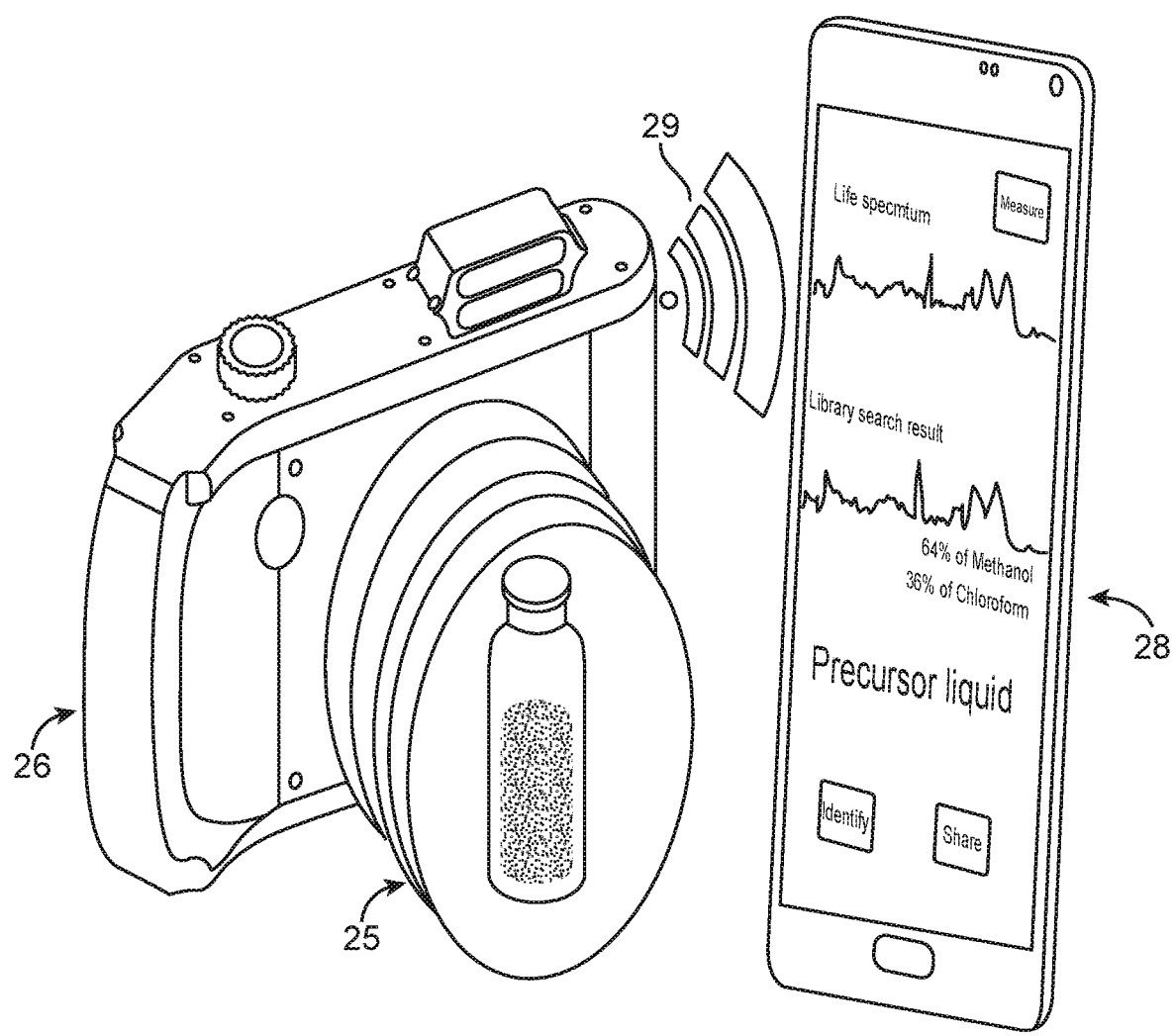

FIG. 5 schematically shows in a perspective view an exemplary embodiment of a system for analysing a Raman spectrum. The system comprises an apparatus 25 mounted by use of a mount to an external device 26 which is, as shown in FIG. 5, a MILC camera, so that, as illustrated above for example with regard to FIG. 4, the external device 26 provides the imaging sensor for detecting the Raman spectrum of a sample hold in the apparatus 25.

The system further comprises an electronic device, here a smartphone 28, which has a storage on which reference spectra of a plurality of materials are stored, for example by use of an app installed on the smartphone. The smartphone 28 may also have access to such reference spectra which are stored on a remote server, for example also by use of an app. As explained above, the imaging sensor of the external device 26 may be used to detect a Raman spectrum of a sample under investigation. The corresponding data may be transmitted from the external device 26 to the smartphone 28 by use of a wireless connection 29. The smartphone 28 may be adapted to determine whether the detected Raman spectrum matches with one of the reference spectra. If this is the case, the smartphone 28 may for example output the name of the sample. The smartphone may also visualize on its screen a live image of the Raman spectrum.

Figure 6:
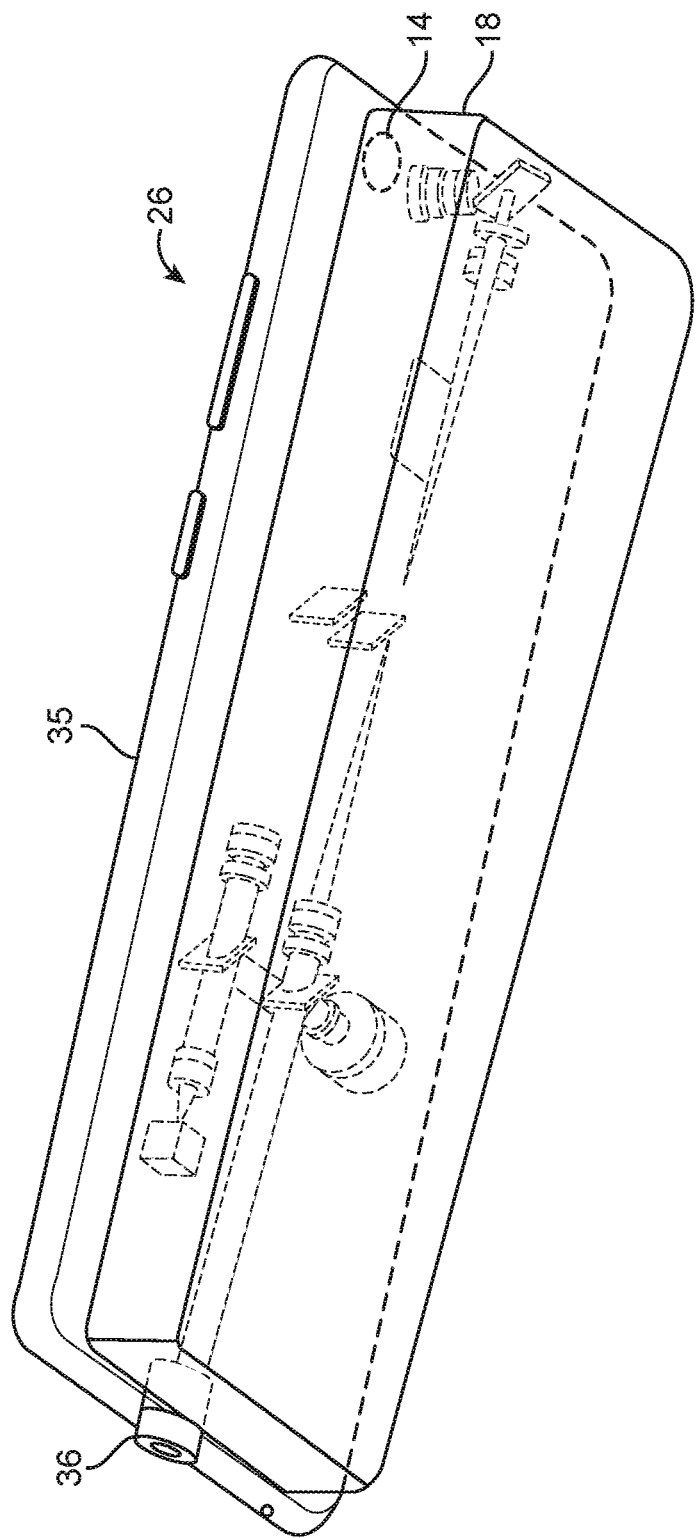

FIG. 6 shows a schematic perspective view of another embodiment of a system for analysing a Raman spectrum in accordance with the present invention. The system comprises an apparatus with an optical-setup as illustrated for example with regard to FIGS. 1 and 2. The apparatus is arranged within housing 18.

The housing 18 is designed such that it provides a docketing insert or socket in which the housing 35 of an external electronic device 26, which is in the example of FIG. 6 a smartphone, can be plugged in. The housing 35 of the smartphone 26 can thereby be mechanically attached, for example by use of a snug-fit, to the housing 18 of the apparatus.

The housing 18 is provided with an aperture (not shown) through which the spatially separated wavelength components of the scattered light can be directed to the outside of the housing 18 and onto an imaging sensor 14 provided by the smartphone 26. The housing 18 and the optical set-up of the apparatus may therefore be adapted such that the aperture in the housing 18 faces the imaging sensor 14 of the smartphone 26 once the housing of the smartphone 26 is plugged into the docketing insert. Thus, the design of the housing 18 may be specific to a particular smartphone model, and the imaging sensor 14 of the smartphone 26 can be used as detector for the apparatus in housing 18. As there is usually an infrared filter arranged in front of the imaging sensor of a smartphone camera, only the part of a Raman spectrum in the visible range can be detected.

The housing 18 can further be provided with an electrical connector 36 through which the apparatus can be electrically connected to the smartphone 26 or to a power supply. By use of the electrical connector 36, elements of the apparatus that require electric power, such as the laser 1, can be connected to the electric power system of the smartphone 26 and provided with electric power from the smartphone 26. Alternatively, they can be connected to a power supply. A battery, in particular a lithium ion battery, could also be placed at the inside of the apparatus.

The electronic device 26, which is in the example of FIG. 6 a smartphone, and the apparatus for carrying out Raman spectroscopy may also be encapsulated in a single housing 18, 35. Thus, the housing 18, 35 may be a single, one piece component in which basically all components of the apparatus are arranged. The housing 18, 35 includes the light source for providing excitation radiation, the optical system for directing the excitation radiation to the sample and for directing scattered light from the sample via a grating to a detector, which corresponds to the imaging sensor of the smartphone 26. The light source may be electrically connected to the electric system of the smartphone 26 in order to provide electrical energy to the light source. The IR-filer in front of the detector may be removed to extend the detectable range into the infrared region.

Figure 7:
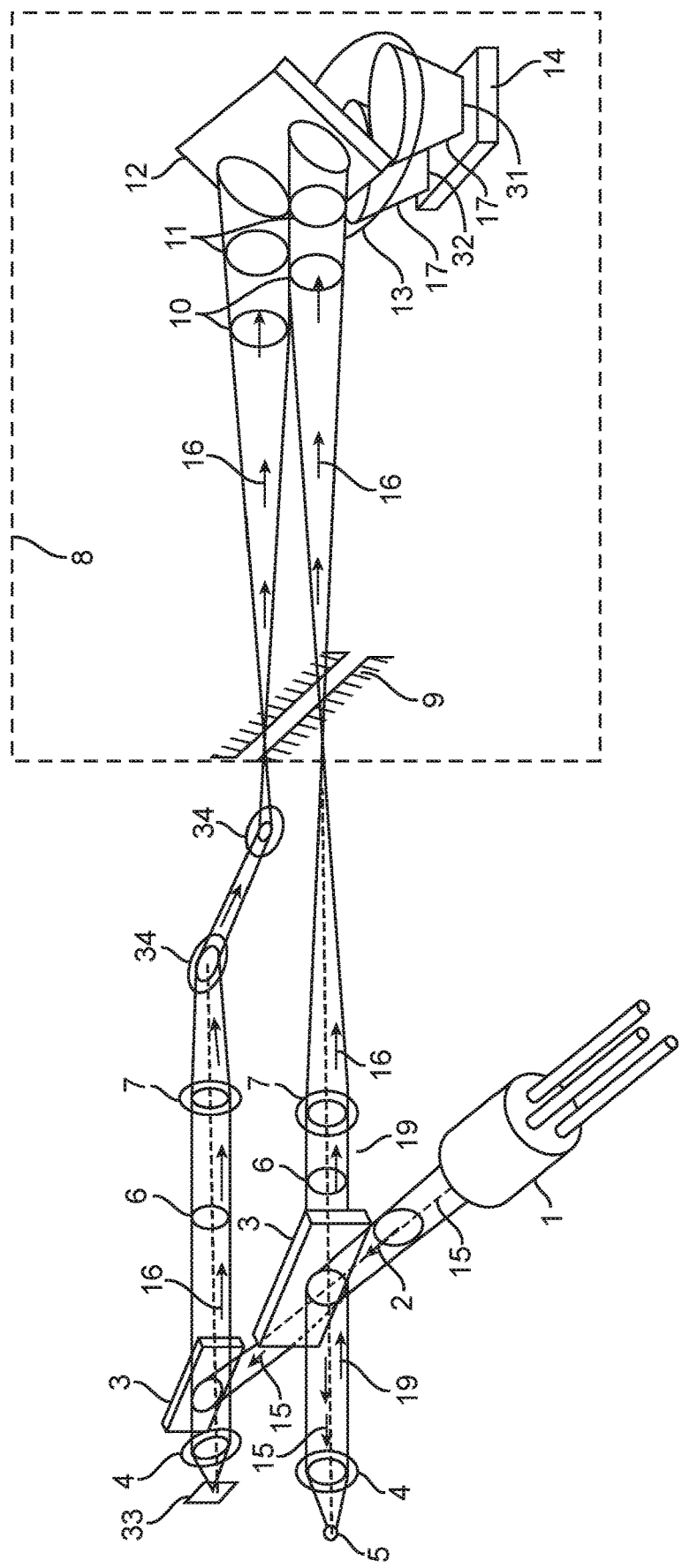

FIG. 7 shows a schematic optical set-up of a fifth embodiment of an apparatus for carrying out Raman spectroscopy. The optical set-up of the apparatus of FIG. 7 is based on the optical set-up as described above with regard to FIGS. 1 and 2 and like elements are denoted with the corresponding reference numerals.

The apparatus of FIG. 7 comprises a laser 1 for providing excitation radiation, and an optical system for directing a portion of the excitation radiation to a sample 5 and for directing scattered light 16 from the sample 5 via a spectrograph 8 to detector 14. The optical system is further adapted to direct a portion of the excitation radiation to a calibration sample 33 and for directing the scattered light 16 from the calibration sample 33 via optical components 6, 7 and mirrors 34 into the spectrograph 8.

The spectrograph 8 is designed to direct, in parallel to the scattered light 16 from the sample 5, the scattered light 16 from the calibration sample 33 via optical components 10 and 11 through the grating 12 and further, by use of optical component 13, onto the detector 14. A Raman spectrum 31 from the sample 5 as well as a Raman spectrum 32 from the calibration sample 33 can thereby be detected simultaneously on the detector 14. Both Raman spectra 31, 32 are detected on separated regions of the detector 14, so that there is no overlap.

The apparatus may further comprise an electronic calibration module (not shown) which can operatively be connected to the detector 14 and read out the data obtained by the detector 14. The calibration module may further be configured to determine the Raman spectrum of the sample 5 from the spectral data provided by the detector 14 for the sample 5. The calibration module may employ the Raman spectral data provided by the detector 14 for the calibration sample 33, which has a known Raman spectrum, to calibrate the detector 14 and use this calibration for the determination of the Raman spectrum of the sample 5.

Figure 8:
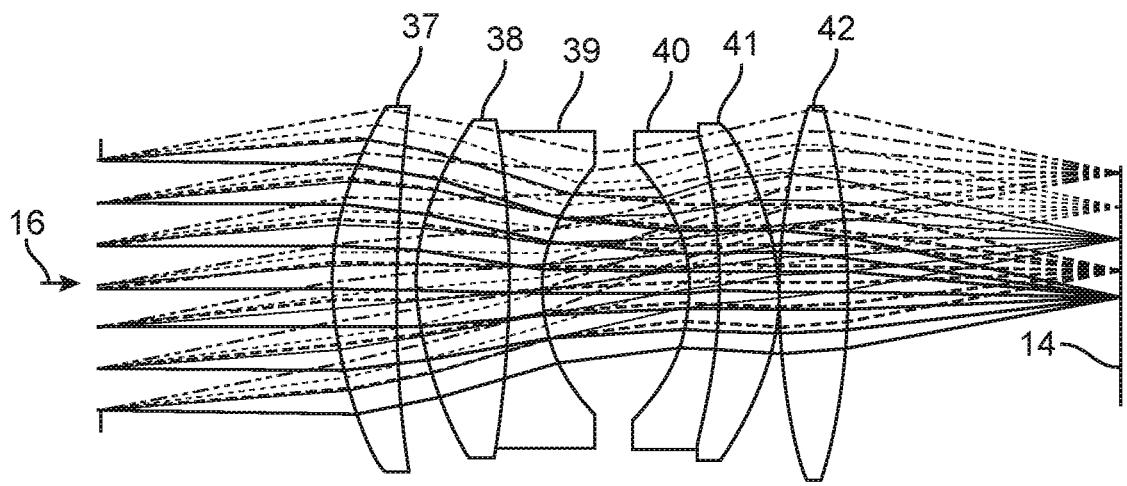

FIG. 8 shows a schematic view of an example of a high numerical aperture imaging lens arrangement 13 usable in the light path of the spectrograph 8 between the grating 12 and the detector 14. The design as shown in FIG. 8 is of the Double-Gauss type and includes six lenses 37, 38, 39, 40, 41, and 42.

Figure 9:
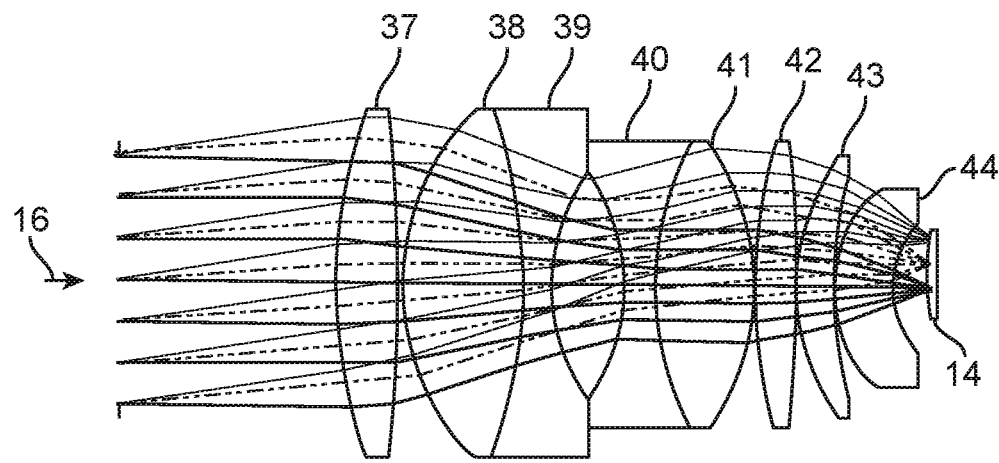

FIG. 9 shows a schematic view of a second example of a high numerical aperture imaging lens arrangement 13 usable in the light path of the spectrograph 8 between the grating 12 and the detector 14. The design as shown in FIG. 9 is of a modified Double-Gauss type design and includes eight lenses 37, 38, 39, 40, 41, 42, 43 and 44.

The lens systems of FIGS. 8 and 9 may be designed without vignetting at the income beam conditions. The lens system could consist of the six (see FIG. 8) or more elements (see FIG. 9) and may have an achromatic design with diffraction limited spot size through the all image planes. The distance between the last element and the imaging sensor 14 can be limited by a protective glass or filters. The lens design may be adjusted to this limitation. For example the design of FIG. 8 has long distance (around 3 mm) to the sensor 14. The design of FIG. 9 has a short distance to the sensor (around 0.4 mm).

In order to obtain a small size Raman spectrum a small imaging sensor is preferably used, for example with dimensions of 2 mm×1.4 mm and with a pixel size in the range of 1-3 micrometer. Such type of sensors are less sensitive than common used sensors in portable Raman spectrometers (usually 25 mm×3 mm size or 12.5 mm×3 mm, pixel size in the range 15-25 micrometer). However, small size Raman spectroscopy may be able to provide comparable sensitivity due to imaging astigmatism free design of the all optics elements from sample probe to detector. This may lead to a much more efficient compression of the Raman signal on sensor pixel size. This may become especially critical for non-cooled sensors with high readout noise.

Figure 10:
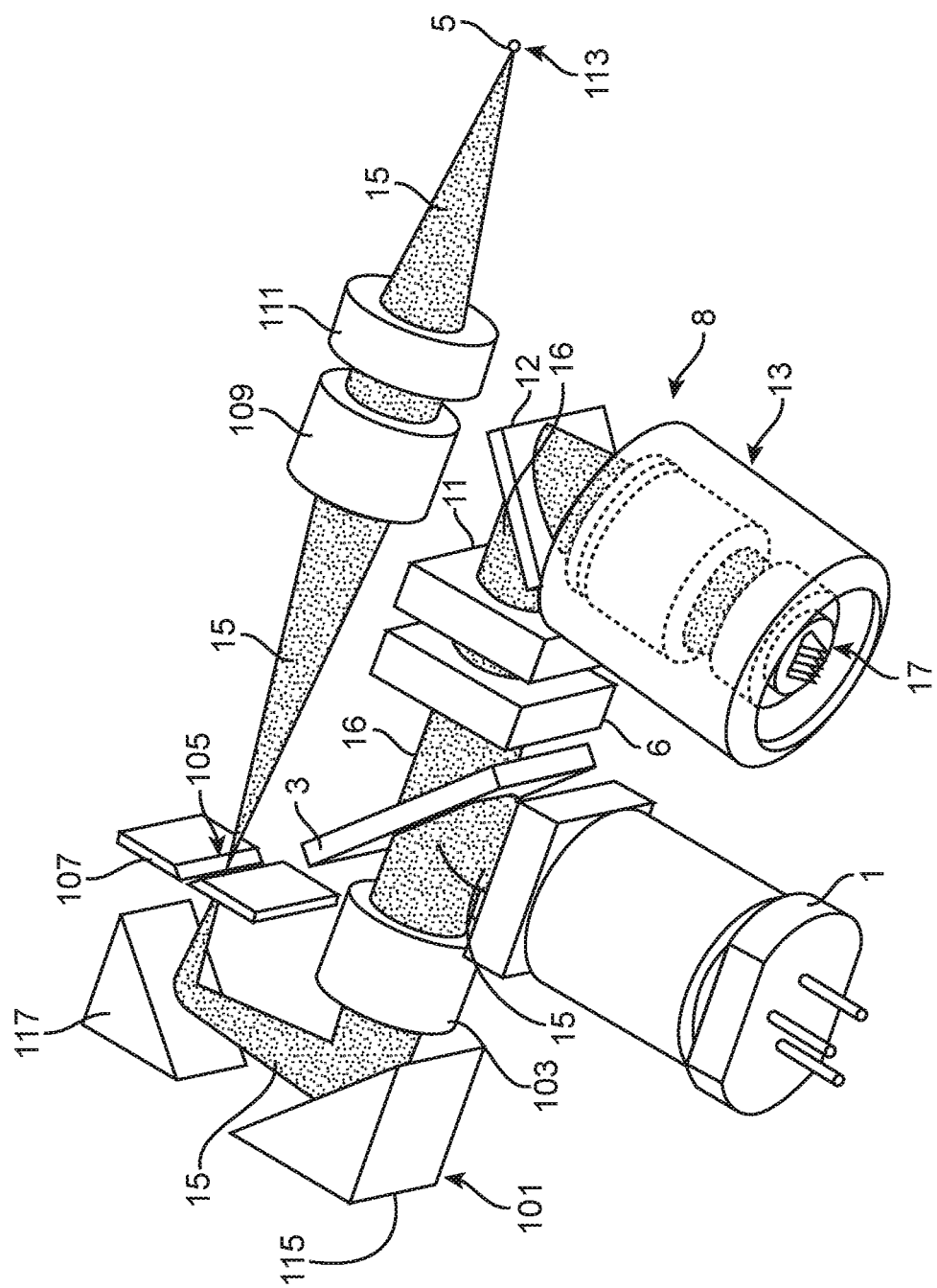

FIG. 10 shows schematically an optical set-up of a sixth embodiment of an apparatus for carrying out Raman spectroscopy in accordance with the present invention. The apparatus of FIG. 10 for carrying out Raman spectroscopy on a sample 5 comprises a light source 1, such as a laser, for providing a beam 15 of excitation radiation, and an optical system 101 which provides an optical light path for directing the beam 15 of excitation radiation to the sample 5 and for directing a beam 16 of scattered light from the sample 5 to a detector (not shown in FIG. 10). The beam 15 of excitation radiation and the beam 16 of scattered light may be continuous beams or pulses.

The optical system 101 comprises a spectrograph 8, preferably comprising a first and second edge filter 6, 11, a grating 12 and a first focusing lens system 13. The first lens system 13 is arranged in the light path between the grating 12 and the detector and serves for focusing the portion of the spectrum onto the detector.

In some examples, the focusing lens system 13 may be an element, which is not part of the optical system 101, but provided by an electronic device, such as a smart phone, which also provides the detector as explained in more detail below with regard to FIG. 12. The first lens system 13 may for example be an objective having a high numerical aperture. The f-number of the objective may for example be 1.2 (f/1.2). The first lens system 13 may comprise or consists one or more lenses, in particular focusing lenses.

The grating 12 is a transmission grating, made for example of fused silica, and the grating 12 is adapted to divide the beam 16 of scattered light into a spectrum of spatially separated wavelength components 17 and to direct at least a portion of the spectrum to the detector (not shown in FIG. 10).

The optical system 101 comprises a second lens system 103 in the light path between the light source 1 and the sample 5. The second lens system 103 has a low numerical aperture. The second lens system 103 can be a single lens or an arrangement of two or more lenses. The second lens system 103 is arranged in the optical system 101 such that it can focus the beam 15 of excitation radiation coming from the light source 1 to a first focal point 105 in the light path between the light source 1 and the sample 5. The first focal point 105 is not the focal point which is intended for the placement of the sample.

A reference sample 107, here in form of a silicon slit, is placed at the first focal point 105. As the second lens system 103 has a low numerical aperture, the exact alignment of the reference sample 107 with respect to the first focal point 105 is less critical in comparison with the usage of a lens with a high numerical aperture.

The numerical aperture of the second lens system 103 may be in the range of 0.03 and 0.20, in particular in the range of 0.05 and 0.11. The ratio between the numerical aperture of the first lens system 13 and the numerical aperture of the second lens system 103 may be in the range between 1.8 and 10, preferably between 2.4-10, further preferably between 4 and 7.

The optical system 101 comprises a third lens system 109 in the light path between the light source 1 and the sample 5. The third lens system 109 has also a low numerical aperture. Its numerical aperture may be the same as the one of the second optical system 103.

The third lens system 109 provides a focal point which is at least approximately at the same point as the first focal point 105. The focal points of both second and third lens system 103, 109 are therefore at least approximately located at the same spot.

The optical system 101 comprises a fourth lens system 111 arranged in the optical path between the third lens system 109 and the sample 5. The fourth lens system 111 is configured to focus the beam 15 of excitation radiation 15 on a second focal point 113 which is on or in the sample 5. The numerical aperture of the fourth lens system 111 can for example be 0.13.

The optical path in between the second lens system 103 and the third lens system 109 comprises two mirrors 115, 117 to reflect the beam 15 of excitation radiation traveling towards the sample 5. The mirrors 115, 117 are arranged such that the beam of excitation radiation 15 travels through the second lens system 103 in a first direction and through the third lens system 109 in a second direction which is antiparallel to the first direction. A compact design can thereby be achieved.

The optical system 101 used to deliver the beam 15 of excitation radiation to the sample is also used to deliver a beam 16 of scattered light from the sample 5 to the spectrograph 8 and the detector. The beam 16 of scattered light 16 is traveling in the opposite direction through the optical system 101, thereby also passing through the reference sample 107.

The reference sample 107 is also exposed to the beam 15 of excitation radiation such that Raman scattering may also occur in the reference sample 107. The beam 16 of scattered light that travels towards the spectrograph 8 and the detector will therefore not only obtain light scattered from the sample 5, but also light scattered from the reference sample 107.

A dichroic beamsplitter 3 is arranged in between the second lens system 103 and the laser 1 and adapted to reflect the beam 15 of excitation radiation towards the second lens system 103 and further towards the sample 3. The dichroic beamsplitter 3 is further configured to let the beam 16 of scattered light pass through. Thus, the dichroic mirror 3 may be designed such that it reflects a range of wavelengths around the wavelength of the beam 15 of excitation radiation while light at wavelengths outside this range of wavelengths is transmitted through the dichroic mirror 3.

The beam 16 of scattered light passes through edge filters 6, 11 and through the transmission grating 12. The transmission grating 12 divides the beam 16 of scattered light into a spectrum of spatially separated wavelength components 17 and directs at least a portion of the spectrum to the first lens system 13 and the detector 14. This spectrum contains spectral lines from the reference sample 107 and from the sample 5. As the spectrum of the reference sample 107 is known, the spectral lines associated with the reference sample 107 can be identified and separated from the detected spectral lines of the sample 5. In particular, at least one spectral line from the reference sample 107 can be identified in the detected spectrum. As the wavelength of this one spectral line is known or pre-given, it can be used to calibrate the wavelengths of the spectral lines of the spectrum detected from the sample 5.

Figure 11:
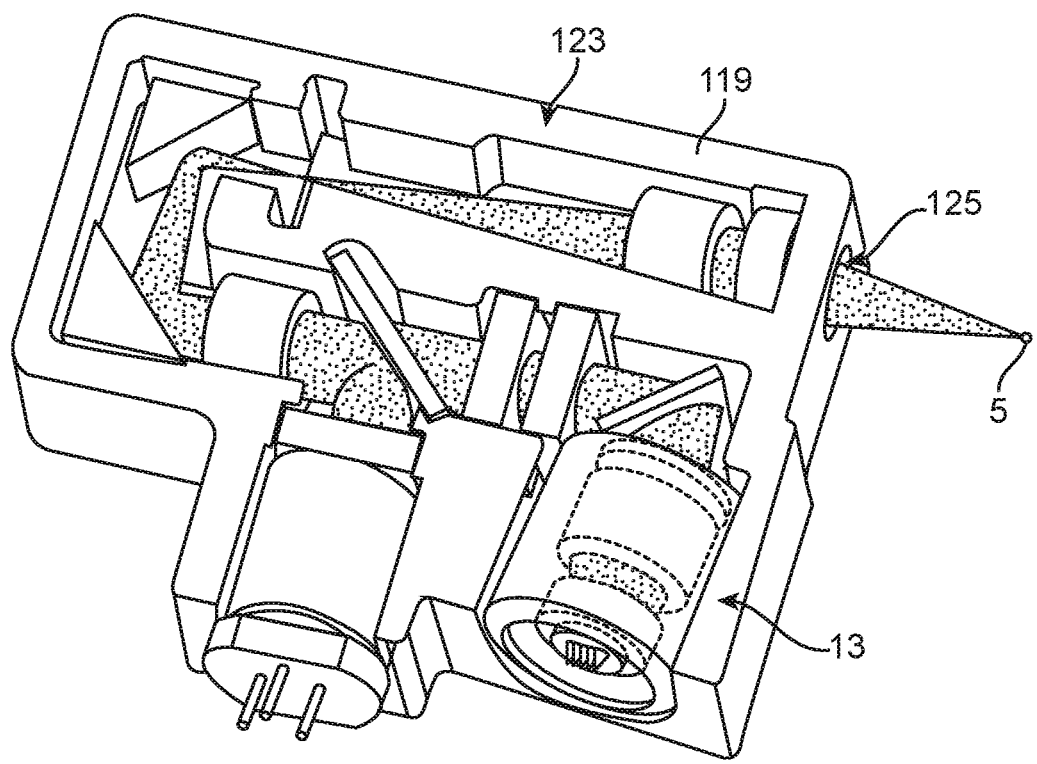

FIG. 11 shows the apparatus of FIG. 10 arranged in a housing 119. The housing 119 has a length and a width that match at least approximately with the length and width of a smartphone 121. The housing 119 can be attached to the smartphone 119 such that the housing's upper side 123 is in contact with the bottom side of the smartphone 121 as shown in FIG. 12.

The housing 119 comprises an opening 125 through which beam 15 of excitation radiation can be focuses on the second focal point 113. The second focal point 113 is therefore located at the outside of the housing 119. The sample 5 can therefore be placed at the outside of the housing 119 allowing for a quick investigation and identification of an unknown sample 5 by detection of its Raman spectrum.

The smartphone's camera (not shown) can serve as a detector for detecting the portion of the spectrum with the wavelength components 17 that is focused by the first optical system 13. A mirror (not shown) may be used to reflect the focused wavelength components upwards towards the upper side 123 of the housing 119 such that they can illuminate the camera of the smartphone 121. The design of the housing 119 and of the optical setup in the housing is therefore such that the focal point of the first lens system 13 will at least approximately be located on the detecting surface of the camera of the smartphone 121.

The smartphone 121 (see FIG. 12) may be configured to identify the spectral lines from the reference sample 107 and thus to separate the spectral lines of the sample 5 from the spectral lines of the reference sample 107. The spectral lines of the sample 5 can be displayed on the display 127 of the smartphone 121. Furthermore, the wavelengths associated with the spectral lines of the reference sample 107 can be pre-defined, and the smartphone 121 can be configured to calibrate the detected spectral lines of the sample 5 by use of a wavelength of a spectral line of the reference sample 107.

The smartphone 121 can further identify the analysed sample 5 by use of its measured Raman spectrum. For example, the smartphone 121 may access a database, which might be stored on a storage of the smartphone 121 or which might be obtained from a server. The database might hold a plurality of sample names with their associated Raman spectrum, so that, by a comparison between the measured Raman spectrum and the Raman spectra in the database, the analysed sample 5 can be identified if it is held in the database.

Figure 12:
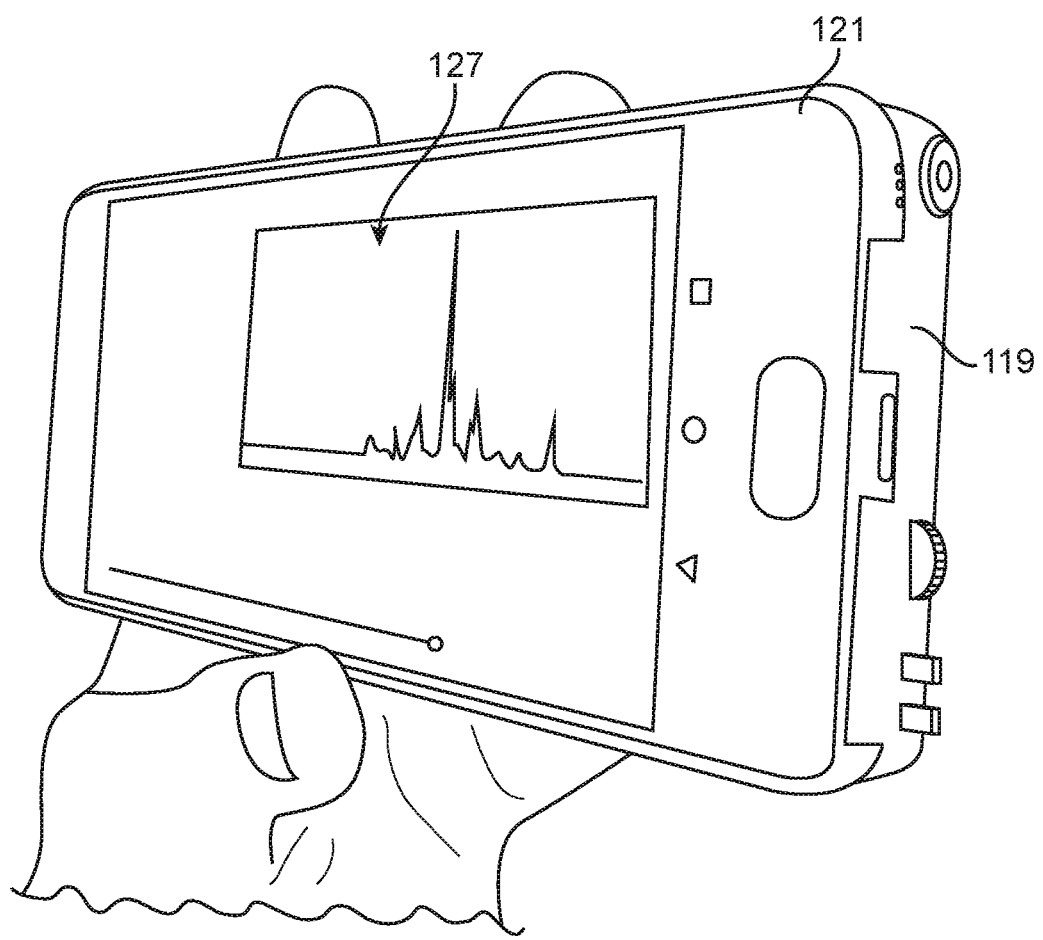
Figure 13:
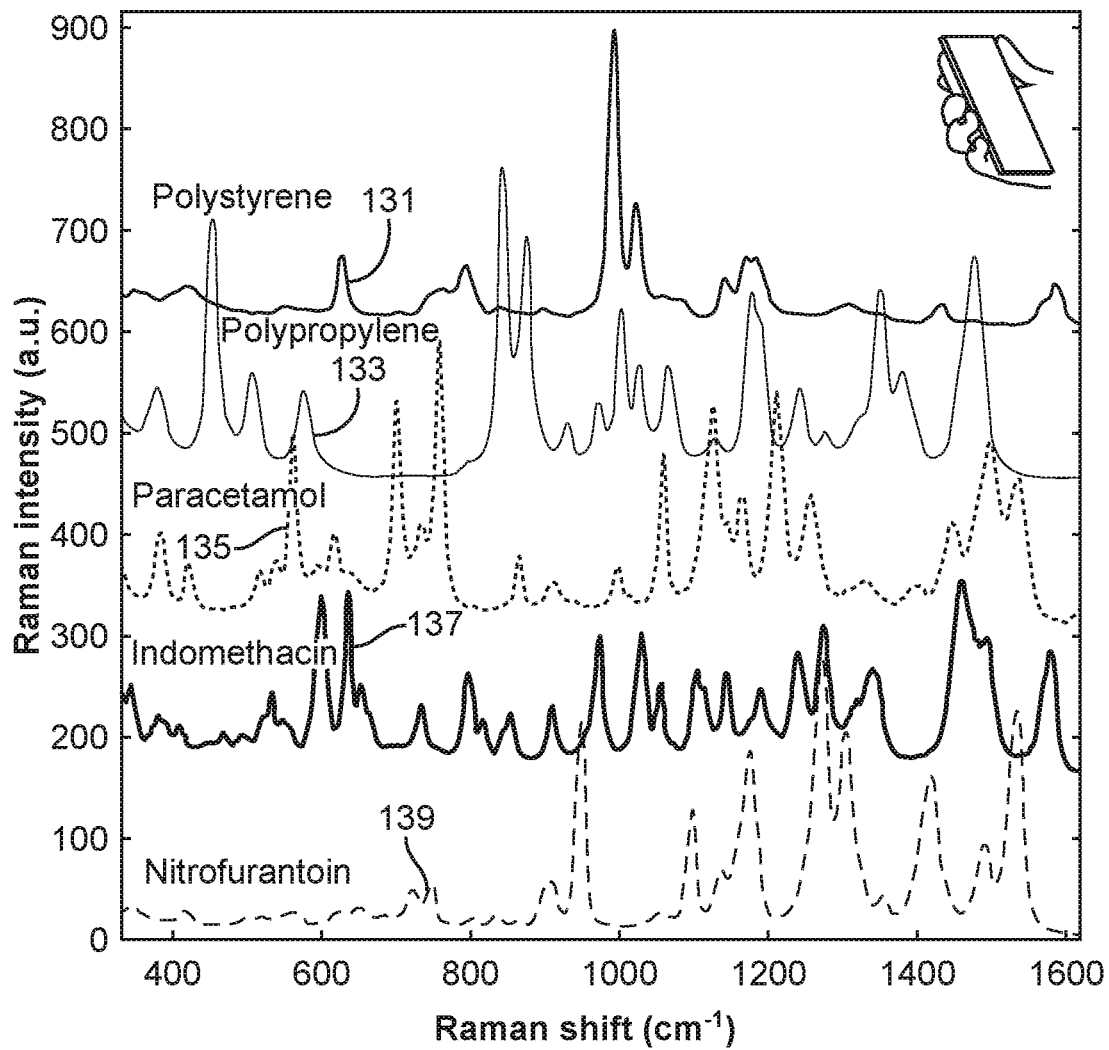

FIG. 13 shows diagram of various Raman spectra obtained by use of the device of FIG. 12. The spectra 131 is the detected Raman spectrum of Polystyrene, the Raman spectrum 133 is the detected Raman spectrum of Polypropylene, the Raman spectrum 135 is the detected Raman spectrum of Paracetamol, the spectrum 137 is the detected Raman spectrum of Indomethacin, and the spectrum 139 is the Raman spectrum of Nitrofurantoin.

Figure 14:
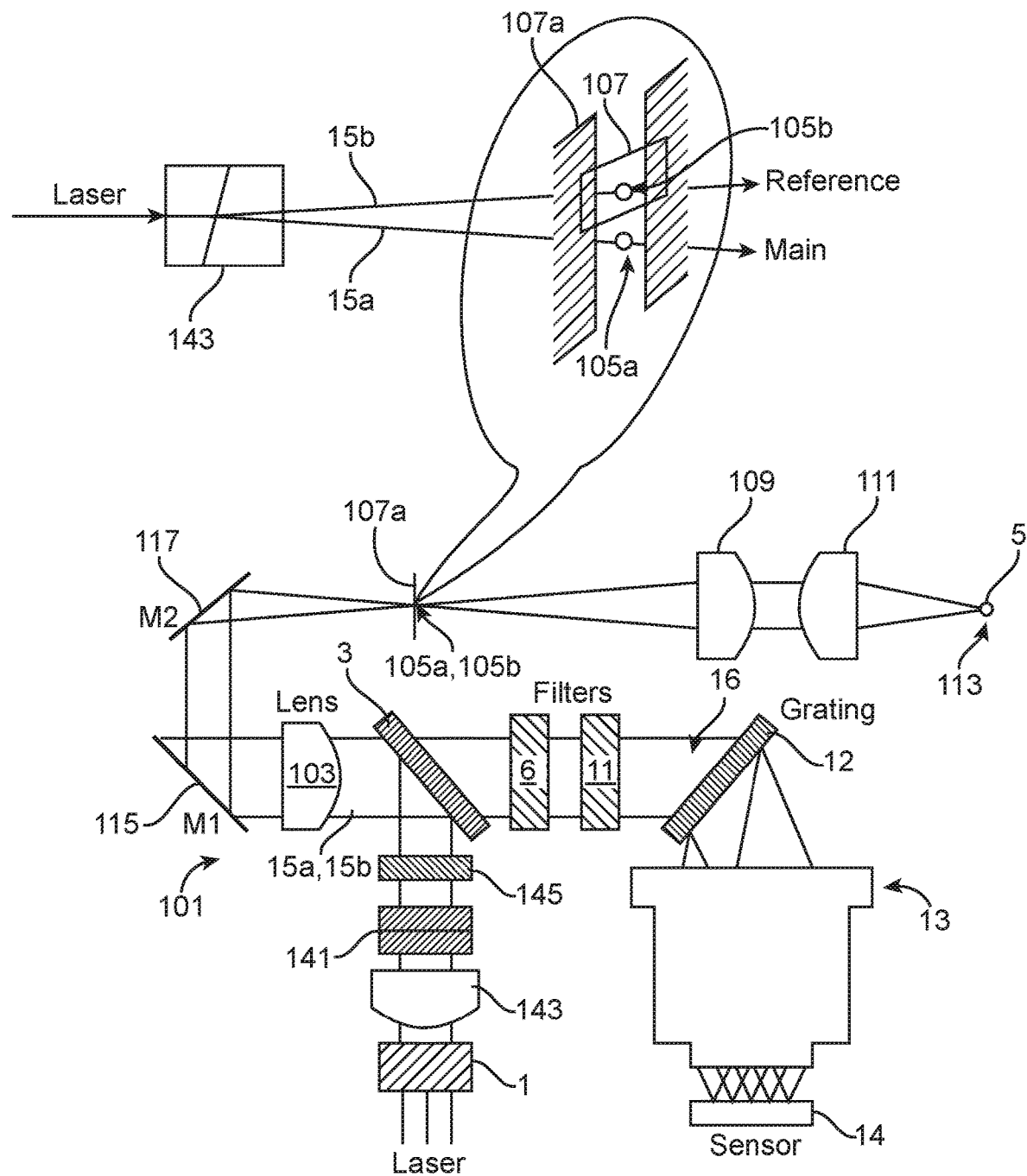

FIG. 14 shows a diagram of a further apparatus for carrying out Raman spectroscopy on a sample 5. The apparatus uses also a reference sample 107 to obtain a reference spectrum that may for example be used to calibrate the Raman spectrum obtained from the sample 5. The set-up of the apparatus of FIG. 14 is similar to the set-up shown in FIG. 10. However, in contrast to the apparatus of FIG. 10, the apparatus of FIG. 14 comprises a Wollaston prism 141 arranged behind a collimator lens 143 which serves to generate a collimated beam 15 of excitation radiation. A filter 145 behind the Wollaston prism 141 may further be adapted to let only a particular spectral range of the excitation radiation pass through while other wavelengths outside the spectral range may be blocked.

The Wollaston prism 141, the lens 143 and the filter 145 are arranged between the light source 1 and the dichroic beam splitter 3. The lens 143 and/or the filter 145 may also be present in the set-up of FIG. 10.

The Wollaston prism 141 splits the incident beam 15 of excitation radiation into two polarized beams 15a, 15b with orthogonal polarization. The two beams 15a, 15b travel along slightly different directions. This has the effect that the second lens system 103 will focus the beam 15a to first focal point 105a while the beam 15b will be focused to a further first focal point 105b that is shifted in the focal plane with respect to the first focal point 105a. A slit 107a may be further arranged in the focal plane as shown in FIG. 14.

A reference sample 107, e.g. polystyrene, is placed such that the focal point 105b is lying on the reference sample 107, while the beam 15a focused at the first focal point 105a does not pass through the reference sample 107 and can further travel towards the sample 5. Thus, in the set-up of FIG. 14, a beam 15 of excitation radiation is split into two beams 15a, 15b. One of the beams 15a serves for obtaining a Raman spectrum from the sample 5 and the other beam 15b serves for obtaining a Raman spectrum from the reference sample 107.

Due to the shift of the focal points 105a, 105b, the beam of scattered light coming from the second focal point 113 on the sample 5 will also be slightly shifted with respect to the beam of scattered light from the focal point 105b on the reference sample 107. Therefore, the spectrum from the reference sample 107 and the spectrum from the sample 5 can be detected in different areas or in different lines of a sensor array of a camera, for example a CCD sensor array. This may simplify a separation of the two spectra.

The devices as described with reference to the drawings allow, at least in some embodiments, determining Raman spectra of samples and identify the samples by use of their Raman spectra. The devices can be produced in a cost-efficient manner and may for example be used to check drugs for their authenticity.

Figure 15:
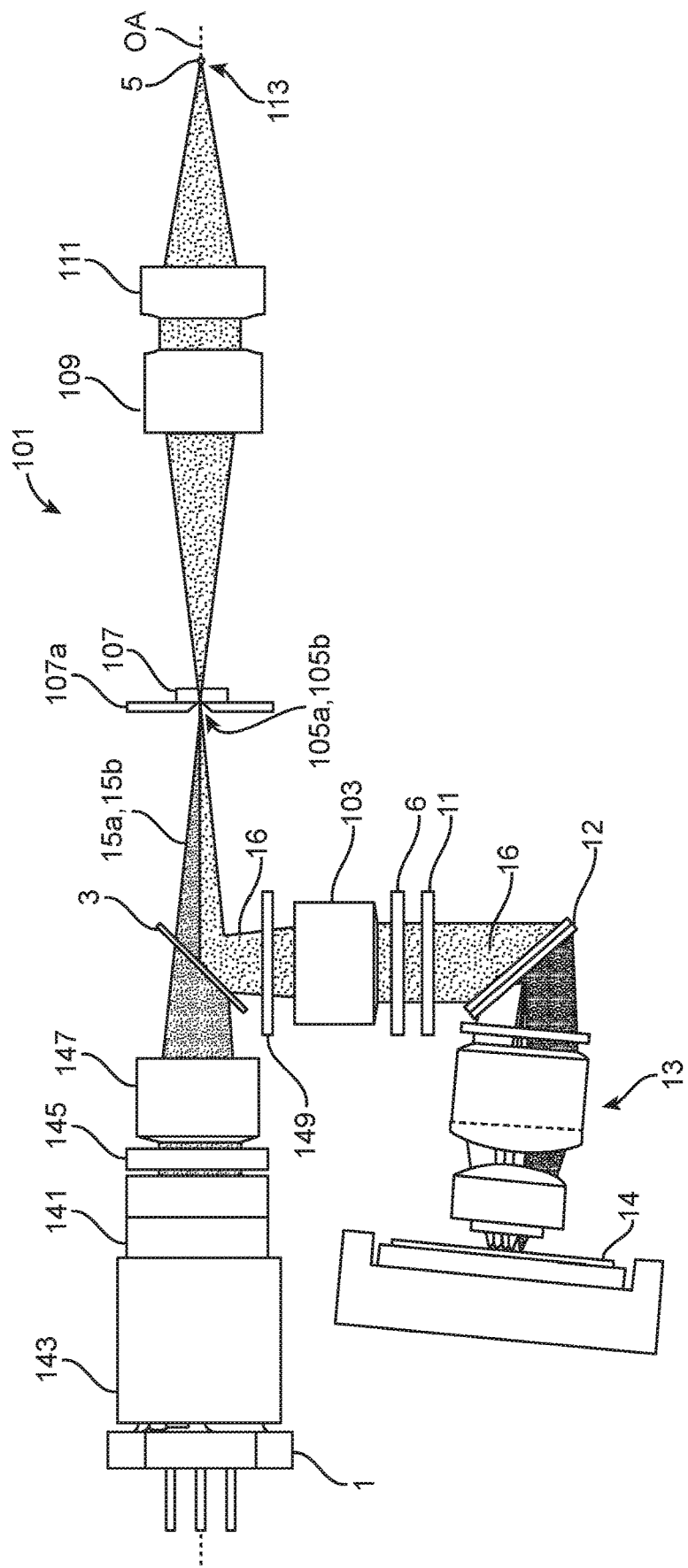
Figure 16:
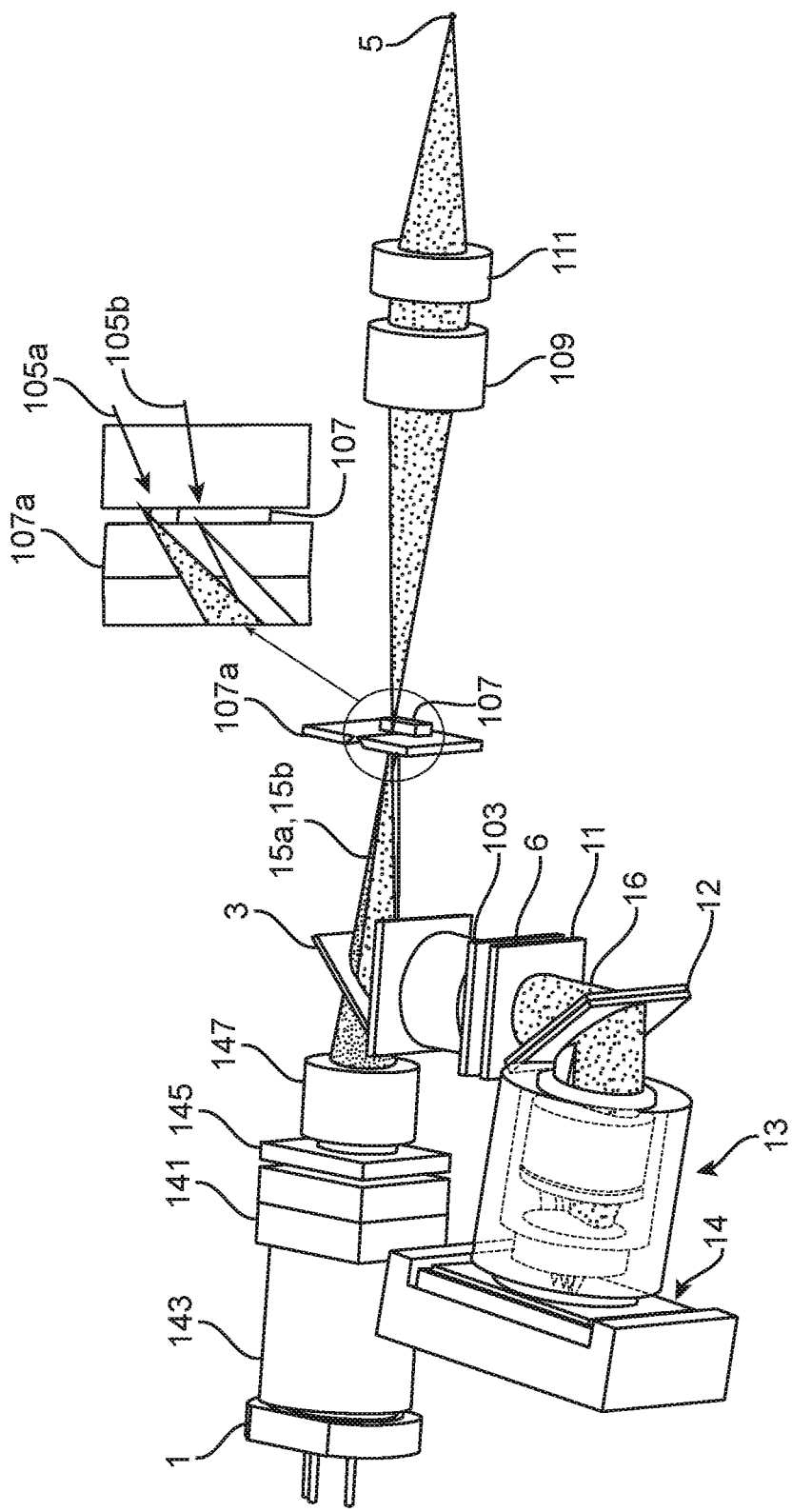

FIGS. 15 and 16 show schematically a further apparatus for carrying out Raman spectroscopy on a sample 5. The set-up of the apparatus of FIGS. 15 and 16 is similar to the set-up shown in FIG. 14. The apparatus uses a reference sample 107 to obtain a reference spectrum, for example, in order to calibrate the Raman spectrum obtained from sample 5. In contrast to the apparatus of FIG. 14, the apparatus of FIGS. 15 and 16 comprises a rectilinear optical axis OA along which the light source 1 and the sample 5 and the components in between the light source 1 and the sample 5 are arranged. These components are:

the lens 143, in particular a collimator lens for collimating the beam 15 of excitation radiation emitted by the light source 1, the Wollaston prism 141 for splitting the beam 15 of excitation radiation into two beams 15a, 15b with orthogonal polarization, the spectral filter 145, a lens 147 for focusing the beams 15a, 15b of excitation radiation through slit 107a, the dichroic beam splitter 3 which is at least partially transparent for at least a spectral portion of the two beams 15a, 15b of excitation radiation, the third lens system 109 which might be a lens and called a slit lens, and the fourth lens system 111, which might also be a single lens for focusing at least the first beam 15a of excitation radiation to the second focal point 113 on or in the sample 5.

The lens 147 may be a component of the second lens system, in addition to element 103 which is preferably a collimation lens. The lens 147 may also be the only component of the second lens system.

As shown in FIG. 16, the second beam 15b is focused on the reference sample 107 which is arranged in the slit 107a such that it blocks the optical path of the second beam 15b, but not the optical path of the first beam 15a.

The beam 16 of Raman scattered light generated from the reference sample 107 and the sample 6 is reflected by the dichroic beam splitter 3 and directed towards the spectrograph 8. The beam 16 passes a filter 149 and then the second optical system 103 which serves as collimator lens and has a focal plane (see focal points 105a, 105b) in the slit 107a.

The further components in the optical path are filters 6, 11, grating 12, focusing lens system 13, and detector 14 and these components function as explained before, for example, with respect to FIG. 14.

As can be seen from FIGS. 15 and 16, the lens 103 of the second lens system is arranged between the dichroic beam splitter 3 and the first lens system 13. Thus, the beams 15*a*, 15*b* that exit from the Wollaston prism 141 do not travel through the lens 103 of the second lens system. However, they travel through lens 147 which might be regarded as a component of the second lens system. The usage of folding mirrors 115 and 117 as used in the setup of FIG. 14 can therefore be avoided. Furthermore, additional fluorescence from the material of the collimation lens 103 can be avoided, as the beams 15*a*, 15*b* of excitation radiation do not pass through this lens.

The lenses 13, 109, 111 and 147 may, for example, be aspherazed or free form lenses. The lenses might be made from glass or plastic. The lens material might be checked on the Raman and/or fluorescence signal level. A material which provides a low Raman and/or fluorescence signal might be preferably used to avoid or minimize such a signal in the detected Raman spectra.

For example, in order to avoid or minimize aberrations that appear after the beams 15*a*, 15*b* of excitation radiation propagate via the dichroic beam splitter 3, the laser focusing lens 147 may be designed in free form or aspherized, or with acylindrical surfaces. All other lenses, such as lenses or lens systems 13, 103, 109 may be produced from glass or from plastic with spherical, aspherical, or free form surfaces.

The apparatus as shown in FIGS. 15 and 16 can be realized in a very compact form. The apparatus can for example be arranged in a housing 153 with very small dimensions.

As shown in FIG. 17, the housing 153 can, for example, have a height H of about 3.5 mm.

As shown in FIG. 18, the housing 153 can, for example, have the following dimensions:

L1=25 mm, L2=11.5 mm, L3=13.5 mm, W1=4.8 mm, W2=12 mm.

Figure 19:
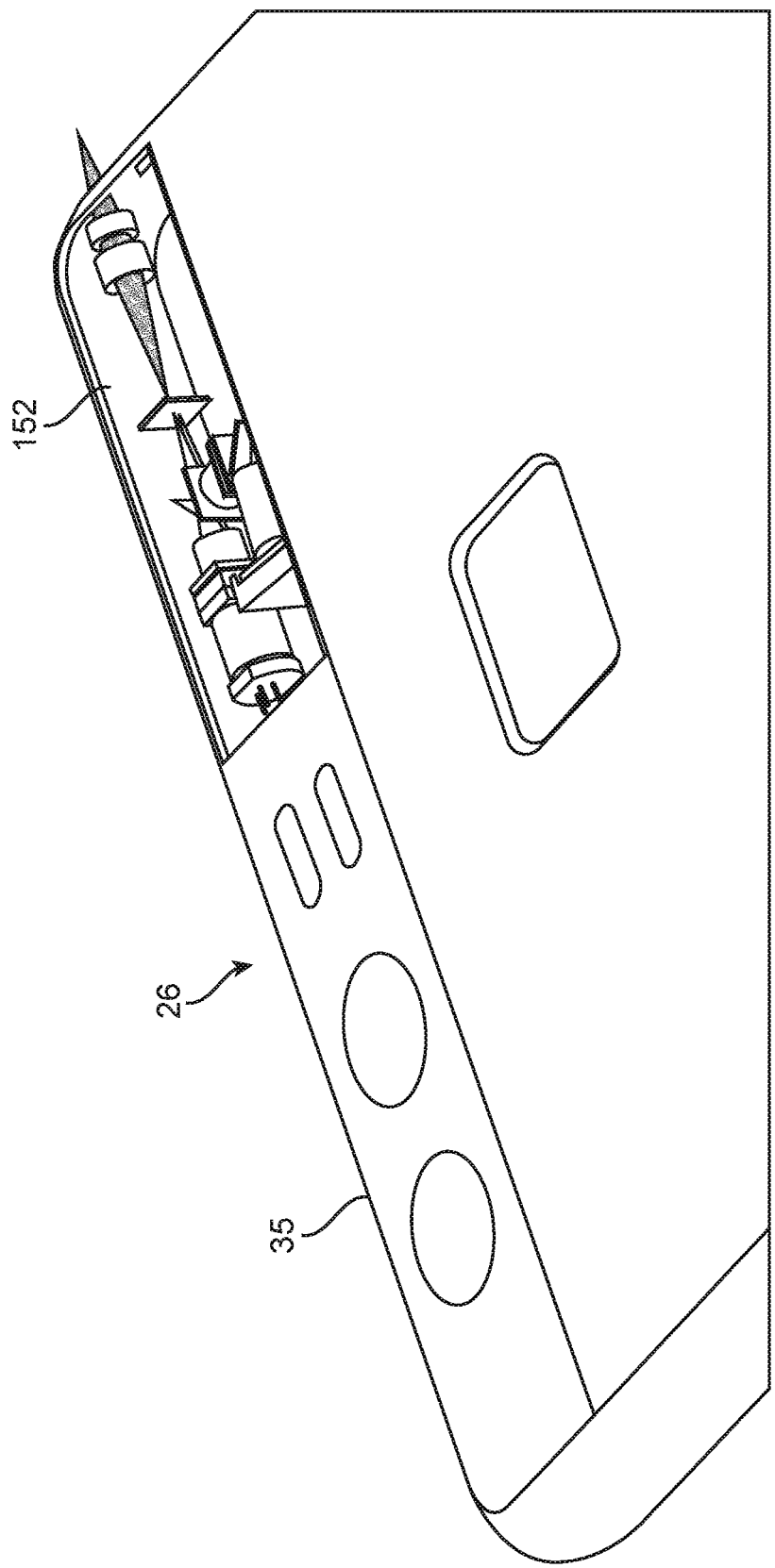

As illustrated in FIG. 19, a smartphone 26 can comprise on the backside of its housing 35 a compartment for receiving the apparatus for carrying out Raman spectroscopy as described with regard to FIGS. 15 to 18. The photo sensor of the smartphone 26 may serve as detector 14 of the apparatus.

The apparatus as shown in FIGS. 20 and 21 can also be used in conjunction with smartphone 26 of FIG. 19. The apparatus of FIGS. 20 and 21 can also be implemented in a very compact form, and the apparatus does not include a classical slit. Rather, the dichroic beam splitter 3 comprises on its surface a coating 157, in particular a metal coating, that provides a slit 107*a*, here realized in form of two openings or holes (apertures). The slit 107*a* is therefore organized as a mask with two holes: a so-called main hole works as a pinhole for the main channel related to the beam 15*a* of excitation light as output from Wollaston prism 141, and a so-called reference hole works as a pinhole for the reference channel related to the beam 15*b* of excitation radiation as output from Wollaston prism 141.

The reference sample 107 is placed in front of the reference hole on dichroic beamsplitter 3. Scattering from the reference sample 107 can therefore propagate to the spectrometer 8 at a 90 degree configuration with regard to the incident reference laser beam 15*a*, 15*b*. In the previous set-up it was a backscattering configuration for the reference sample 107.

The beam 16*a* of excitation radiation from the main sample 5 and the beam 16*b* of excitation radiation from the reference sample 107 form a reference and main channel with respect to the beams 16*a*, 16*b* traveling towards the detector.

The reference sample 107 is placed on the slit 107*a*, but the laser 1 illuminates the reference sample 107 outside of the spectrograph 8. In such way, a decrease of the level of stray light can be obtained because the beams 15*a*, 15*b* are not propagating in the spectrograph 8. Another benefit is that the classical slit can be removed in the set-up of FIGS. 20 and 21, as it is organized by use of a coating on the surface of dichroic beamsplitter 3. This is cheap and scalable in mass production type of slit.

The apparatus as described with reference to FIGS. 22 to 25 is similar to the previously described apparatus and can be used, for example, also in conjunction with smartphone 26 of FIG. 19. The apparatus of FIGS. 22 to 25 can also be implemented in a very compact form, and the apparatus does not include a classical slit. Furthermore, as can be seen in particular in FIGS. 22 and 24, the mirror 155 and the beam splitting element 3 are arranged such that the optical system for providing the beams of excitation radiation 15*a*, 15*b* to the sample 5 and the reference sample 107 on the beam splitting element 3 has a z-like form. A scattering from the reference sample 107 propagates to the spectrograph (see, for example the components 12 and 13 of the spectrograph) at, for example, a 12 to 15 degrees configuration with regard to the incident beam of excitation radiation. In contrast to a backscattering or 180 degrees configuration, the configuration of the apparats of FIGS. 22 to 25 provides a reduced level of aberrations.

The lens 143, the Wollaston prism 141, the filter 145, and the lens 147 are arranged between the light source 1 and the dichroic beam splitter 3. The Wollaston prism 141 splits the incident beam 15 of excitation radiation into two polarized beams 15*a*, 15*b* with orthogonal polarization. The two beams 15*a*, 15*b* travel along slightly different directions. This has the effect that the lens 147, which can be regarded as a part of the second lens system, will focus the beam 15*a* to first focal point 105*a* while the beam 15*b* will be focused to a further first focal point 105*b* that is shifted in the focal plane with respect to the first focal point 105*a*.

Figure 23:
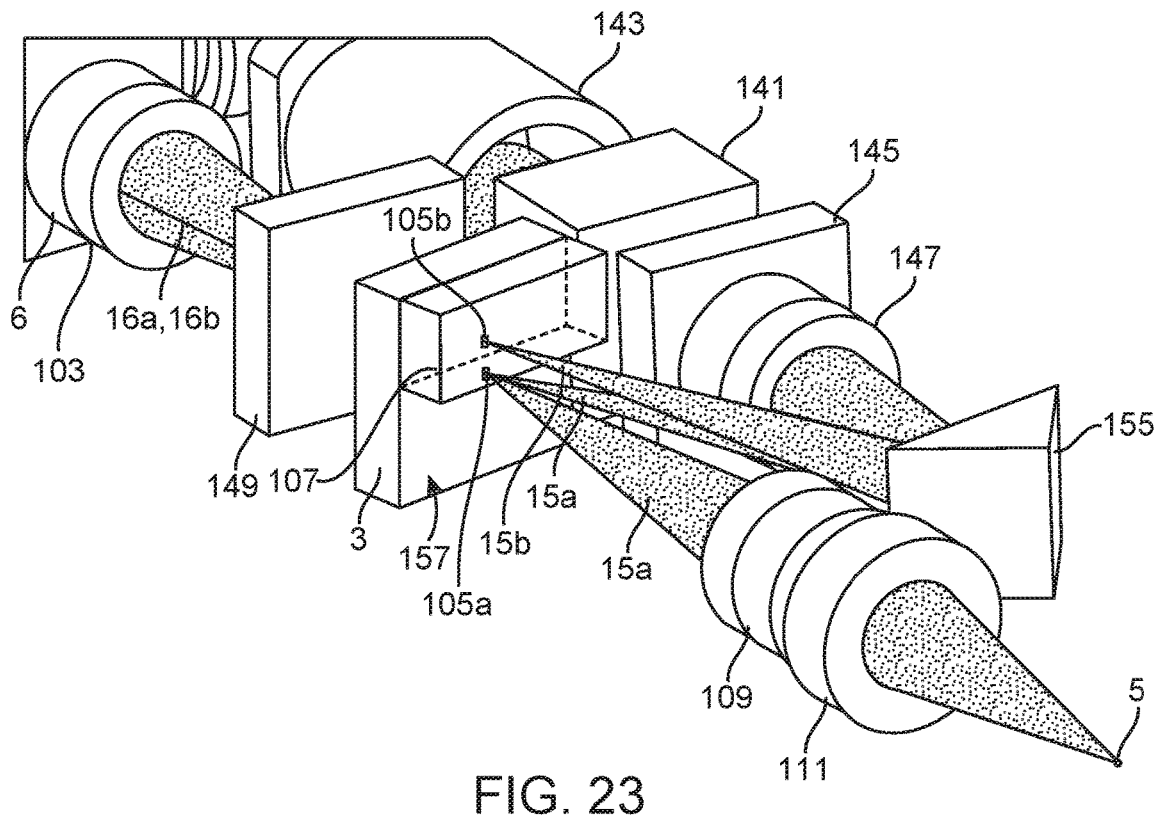
Figure 24:
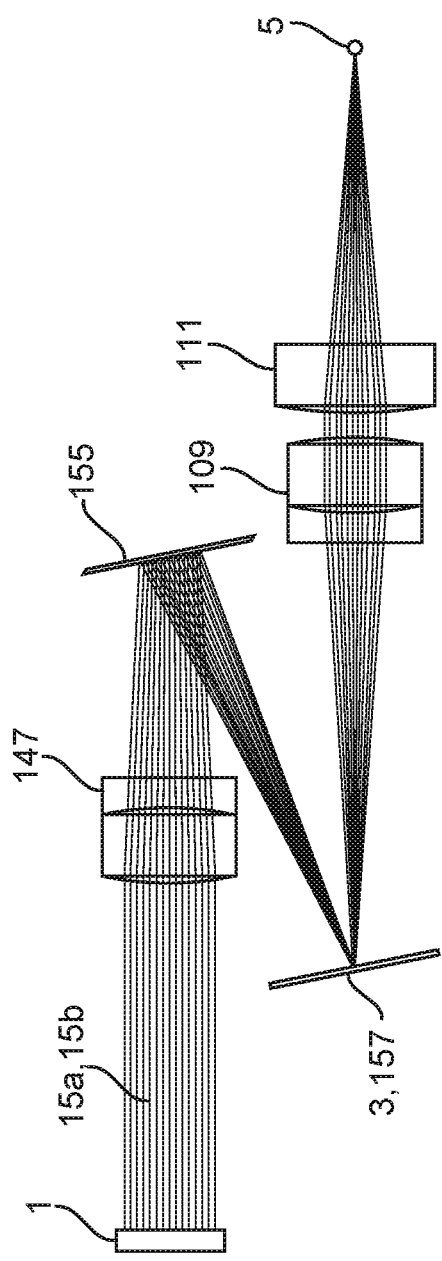
FIG. 24 illustrates the beam delivery system of the apparatus of FIG. 22.
Figure 25:
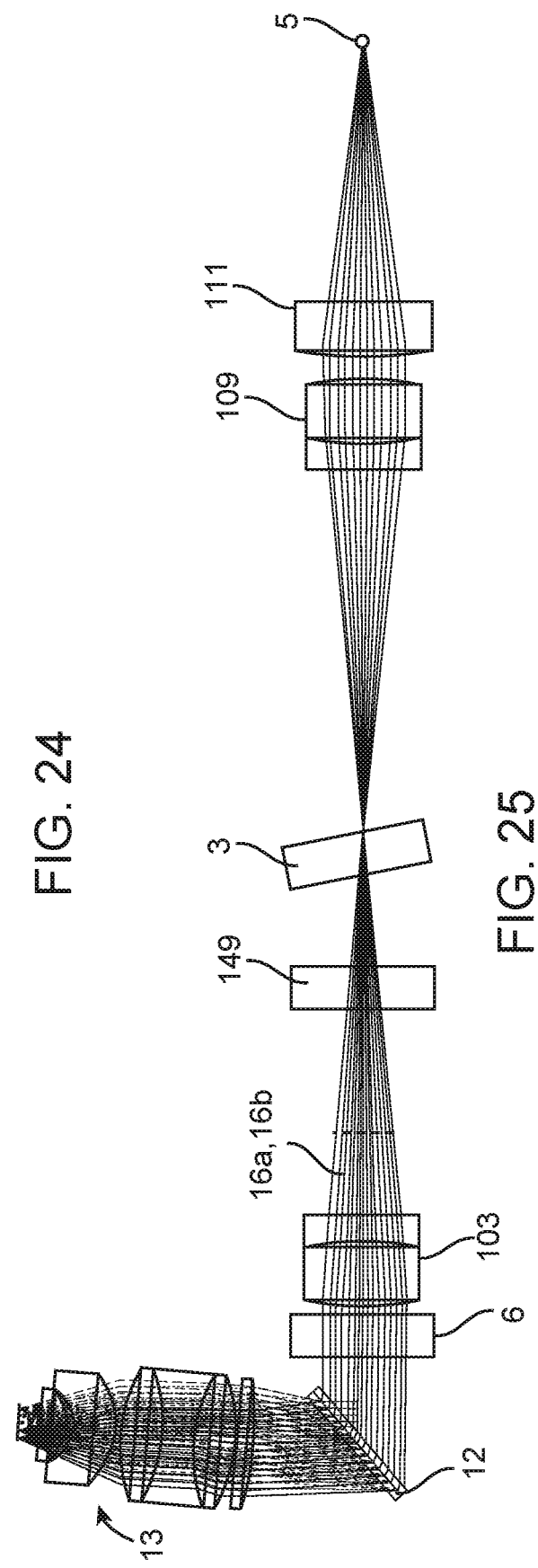
FIG. 25 illustrates the Raman beam delivery system of FIG. 22, FIG. 26 a perspective view of a beam splitting element of the apparatus of FIG. 22, and FIG. 27 an enlarged section of FIG. 26.

A reference sample 107, e.g. polystyrene, is placed such that the further first focal point 105*b* is on the reference sample 107, while the beam 15*a* focused at the first focal point 105*a* does not pass through the reference sample 107 and can further travel towards the sample 5. As shown in FIG. 23, the beam 15*a* is reflected from the beam splitting element 3 such that it can travel through lens systems 109, 111 to the sample 5. The beam 15*b* may not be reflected by the beam splitting element 3 and beam 16*b* of Raman scattered light from the reference sample 107 can travel through the spectrograph 8 such that the detector may detect the Raman spectrum of the reference sample 107.

The beam splitting element 3 can be a dichroic mirror or any other suitable element. The beam splitting element 3 can also be an edge filter which is configured to reflect light at a wavelength of the excitation radiation but which is light-transmissive for scattered Raman light from the sample 5 and the reference sample 107.

As mentioned before the apparatus of FIGS. 22 to 25 does not include a classical slit of the spectrograph 8. Rather, a mask, in particular a coating 157, such as a metal coating and/or a dichroic coating, is formed on the surface of the beam splitting element 3 that faces the incoming beams 15*a*, 15*b*.

Figure 27:
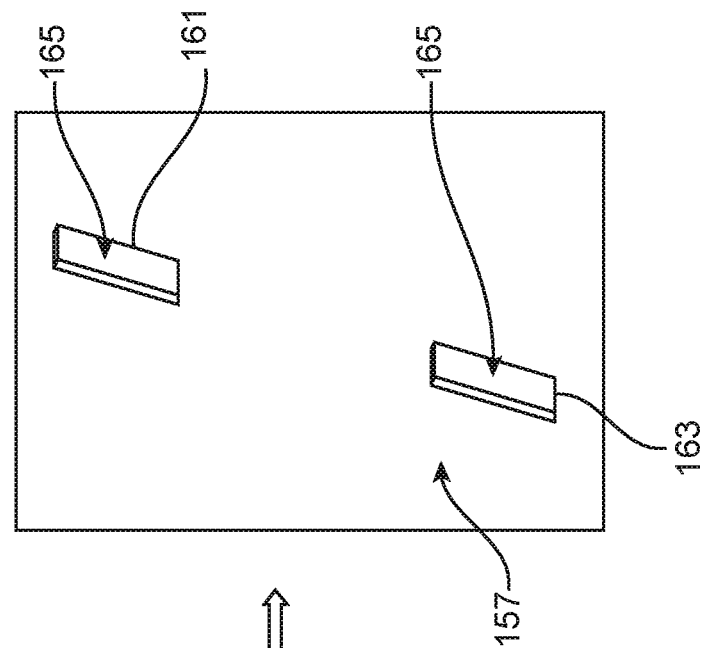
Figure 26:
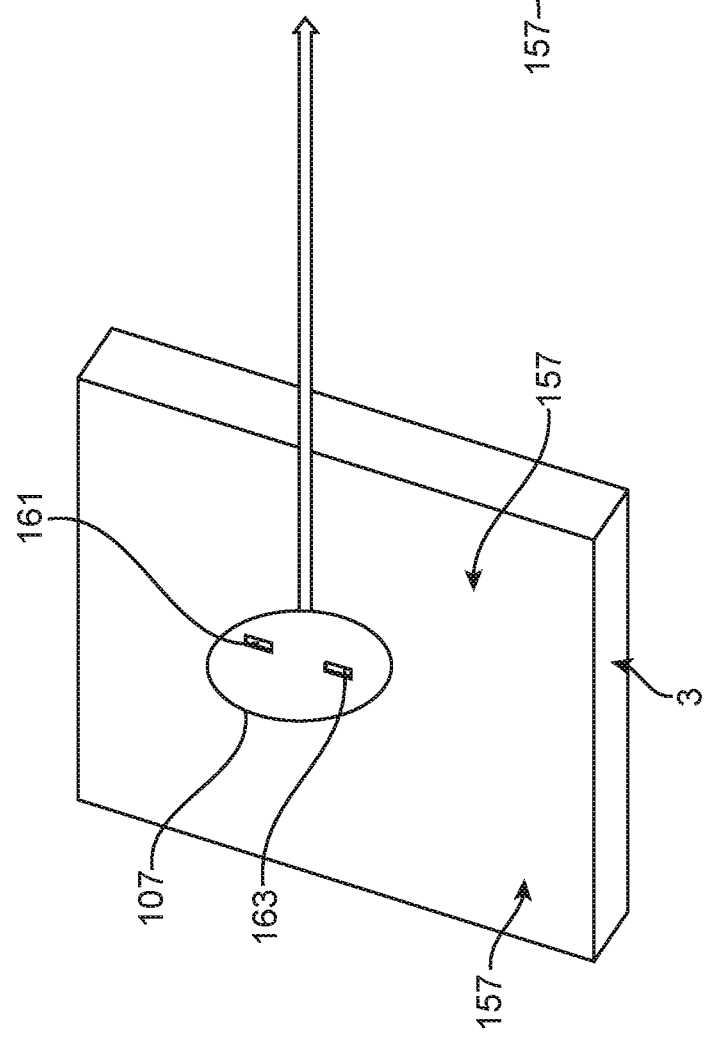

As shown in FIGS. 26 and 27, which show the beam splitting element 3 in more detail, the slit is in particular formed by two apertures 161, 163 in the coating 157. The apertures 161, 163 are through holes through the coating 157 where the coating of the slit material is completely removed.

The distance between the apertures 161, 163 is adapted to the distance of the focal point 105a, 105b in the focal plane. The apertures 161, 163 can therefore serve as pinholes for the beams 15a, 15b. For example, aperture 161 may serve as a pinhole for the main channel and thus for beam 15a that illuminates the sample 5. Similarly, aperture 163 may serve as a pinhole for the reference channel, and thus for beam 15b which illuminates reference sample 107 that may be arranged in or on the aperture 163.

FIG. 27 shows a second coating 165 at the bottom of the apertures 161, 163. The second coating 165 might be a BLP01-785R coating, and the second coating might be the coating that provides the functionality of an edge filter. As described before, the second coating 165 may be such that light at a wavelength of the beams 15a, 15b is reflected while Raman scattered light from the sample 5 and the reference sample 107 can pass through the second coating 165 and thus through the beam splitting element.

The implementation of the slit by use of two apertures in the coating 157 is only an example. Another example could be a single aperture that also extends in the region between the two apertures 161, 163 of FIG. 27. An advantage of realizing the slit by use of one or more apertures in a coating on beam splitting element 3 is that it can be produced in an inexpensive way and that the production process is scalable for mass production.

Figure 22:
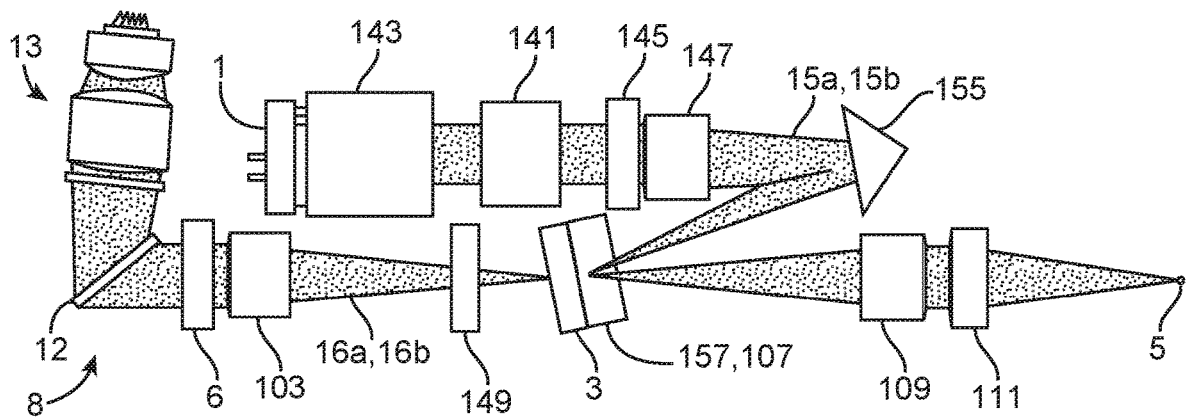

Some dimensions and exemplary types of optical components of the apparatus of FIG. 22 will now be mentioned:
Lens 143: f1—Aspheric lens, lens 11 mm
Lens 145: f2—Achromatic doublet lens, 30 mm
Lens 109: f3—Achromatic doublet lens, 20 mm
Lens 111: f4—Aspheric lens, lens 13.86 mm or Objective
Filter 145: F1—Laser line filter
Beam splitting element 3: F2—Edge filter with slit mask
Filter 149: F3—Edge filter
Lens system 13: Objective—Spectrograph focusing objectives
Grating 12: Fused silica transmitting grating
All lenses may be lens systems and thus comprise more than one lens.

Preferred embodiments of the present invention, which may in particular be related to the examples shown in the drawings, are summarized by the following list of items:

1. An apparatus for carrying out Raman spectroscopy on a sample (5), the apparatus comprising:
    a light source (1) for providing excitation radiation,
    an optical system for directing the excitation radiation to the sample (5) and for directing scattered light (16) from the sample (5) to a, preferably external, detector (14),
    a housing (18) for the light source (1) and the optical system and preferably also for the sample (5),
    the optical system comprising a grating (12) for dividing the scattered light (16) into spatially separated wavelength components (17) and for directing at least a portion of the spatially separated wavelength components (17) to the detector (14),
    the optical system being adapted to direct at least a portion of the spatially separated wavelength components (17) through an aperture of the housing (18) and on the detector (14) for detecting the portion of the spatially separated wavelength components (17) of the scattered light.

2. The apparatus of item 1,
    wherein the detector (14) is an imaging sensor, preferably of an external device such as digital camera or a smartphone or a tablet, and/or the housing (18) is a single housing in which the light source (1) and the optical system and preferably the sample (5) are arranged, and/or the housing (18) has a mount adapted to mount the detector (14), in particular a housing of the detector, to the housing (18) of the apparatus, wherein, preferably, the mount is a standardized mount, preferably of the type of a standard lens mount, such as a bayonet or screw Sony E-mount, Canon EF (EF-S)-mount, Nikon F-mount, Leica L-mount, Leica M-mount, Micro Flow Thirds, Nikon 1-mount, Pentax K-mount, and/or the housing (18) is provided with a connector or a docketing insert to mechanically attach the housing (18) of the apparatus to a housing of an external electronic device (26), such as a smartphone or a tablet, and/or the housing (18) is provided with an electric connector (36) to electrically connect at least one component of the apparatus, in particular the light source (1), with the external electronic device (26) or a power supply.

3. The apparatus of item 1 or 2,
    wherein the housing (18) is of a compact form, having at maximum a length of 200 mm, preferably 150 mm, further preferably 120 mm, a width of 100 mm, preferably 90 mm, further preferably 85 mm, further preferably 70 mm, and a height of 100 mm, preferably 90 mm, further preferably 85 mm, and preferably a height in the range between 10 mm to 100 mm, further preferably in the range between 8 mm to 15 mm.

4. The apparatus of any one of the preceding items,
    Wherein the grating (12) is a transmission polarization independent grating, and/or
    the grating (12) is provided with 1000 grooves/mm or more, preferably with 1500 grooves/mm or more, further preferably with 1700 grooves/mm or more, further preferably with 2000 grooves/mm or more, still further preferably with 2300 grooves/mm or more, and/or
    the grating (12) is made of fused silica, preferably with a diffraction efficiency of more than 85% or more than 92% in the all measured Raman shift spectral range.

5. The apparatus of any one of the preceding items,
    wherein the apparatus comprises a sample holder for holding the sample (5), wherein, preferably, the sample holder comprises a rotatable sample wheel (22) for holding a plurality of samples (5) at different positions around a rotational axis (A) of the sample wheel (22), and/or
    wherein, preferably, the sample holder comprises an accessory attached or attachable to an external electronic device such as a smartphone or a tablet.

6. An apparatus for carrying out Raman spectroscopy on a sample (5), in particular in accordance with any one of the preceding items,
    the apparatus comprising:
    a light source (1) for providing excitation radiation, and
    an optical system for directing the excitation radiation (15) to the sample (5) and for directing scattered light (16) from the sample (5) to a detector (14),
    the optical system comprising a spectrograph (8), preferably comprising or consisting of a slit (9), a collimation lens (10), a grating (12) and a focusing lens (13),
    the spectrograph (8) comprising a grating (12), in particular a transmission grating, adapted to divide the scattered light (16) into spatially separated wavelength components (17) and to direct at least a portion of the spatially separated wavelength components (17) to the detector (14), and the spectrograph (8) further comprising a high numerical aperture imaging lens arrangement (13) in the light path between the grating (12) and the detector (14).

7. The apparatus of any one of the preceding items,
wherein the optical system comprises a collimation lens (10) arranged in the spectrograph light path of the scattered light (16) between a slit (9) of the spectrograph (8) and the grating (12),
wherein, preferably, the collimation lens (10) has a low numerical aperture, preferably in the range of 0.03-0.20, in particular 0.05-0.11,
wherein, preferably, the ratio between the numerical aperture of the high numerical aperture imaging lens arrangement (13) and the numerical aperture of the collimation lens is in the range between 1.8 and 10, preferably between 2.4-10, further preferably between 4 to 7.

8. The apparatus of item 6 or 7,
wherein the high numerical aperture (NA) imaging lens arrangement (13) has an aberration corrected design with regard to at least one of the following: chromatic aberrations, astigmatism, coma, spherical aberrations, and/or
the high numerical aperture imaging lens arrangement (13) has a numerical aperture in the range of 0.1-0.5, preferably 0.16-0.3.

9. The apparatus of any one of the preceding item,
wherein the optical system comprises a dichroic mirror (3) in the light path between the light source (1) and the sample (5), and/or
the optical system comprises a slit lens (7) in the light path between the sample (5) and the detector (14), the slit lens (7) being configured to focus the scattered light (16) through a slit (9) of the spectrograph (8), the slit lens (7) having preferably a numerical aperture that corresponds to the numerical aperture of a collimation lens (10).

10. The apparatus of any one of the preceding items,
wherein the optical system is designed such that the light path of the excitation radiation (15) traveling to the sample (5) and the light path of the scattered light (16) traveling from the sample (5) towards the detector (14) are, over a specific distance, aligned with or parallel to each other and directed in opposite directions, and/or
the optical system comprises a lens arrangement, in particular an objective (4), such as a microscope objective, in the light path between the light source (1) and the sample (5), preferably between a dichroic mirror (3) and the sample (5), for focusing the excitation radiation from the light source (1) onto the sample (5), wherein, preferably, the lens arrangement has a numerical aperture in the range of 0.15-0.9.

11. An apparatus for carrying out Raman spectroscopy on a sample, in particular in accordance with any one of the preceding items, the apparatus comprising:
a light source (1) for providing excitation radiation,
an optical system for directing the excitation radiation to the sample (5) and for directing scattered light from the sample (5) to a detector (14),
the spectrograph comprising a grating (12) for dividing the scattered light (16) into spatially separated wavelength components (17) and for directing at least a portion of the spatially separated wavelength components (17) to the detector (14),
the grating (12) being a polarization independent transmission grating, preferably made of fused silica with a diffraction efficiency of more than 85% in the collected spectral range of Raman shift.

12. An apparatus for carrying out Raman spectroscopy on a sample,
in particular in accordance with any one of the preceding items,
the apparatus comprising:
a light source (1) for providing excitation radiation,
an optical system for directing a portion of the excitation radiation to the sample (5) and for directing scattered light from the sample (5) via a spectrograph (8) to a detector (14), and
the optical system being further adapted to direct a portion of the excitation radiation to a calibration sample (33) and for directing the scattered light from the calibration sample (33) via the spectrograph (8) to the detector (14).

13. The apparatus of item 12, further comprising a calibration module being operatively connected to the detector (14) and configured to determine the Raman spectrum of the sample (5) from the spectral data provided by the detector (14) for the sample (5) and in dependence on the Raman spectral data provided by the detector (14) for the calibration sample (33).

14. An apparatus for carrying out Raman spectroscopy on a sample (5), in particular in accordance with any one of the preceding items, the apparatus comprising:
a light source (1) for providing excitation radiation,
an optical system for directing the excitation radiation to the sample (5) and for directing scattered light (16) from the sample (5) to a detector (14),
a housing (18) for the light source (1) and the optical system and preferably also for the sample (5),
the optical system comprising a grating (12) for dividing the scattered light (16) into spatially separated wavelength components (17) and for directing at least a portion of the spatially separated wavelength components (17) to the detector (14),
wherein the detector (14) is an imaging sensor (14) of an electronic device (26), preferably a smartphone or a tablet, having a display and a CPU for processing and visualizing data received from the detector (14), and
the housing (18) being a single housing in which the light source (1), the optical system, the electronic device (26) and preferably the sample (5) are arranged or encapsulated,
wherein, preferably, the light source (1) is electrically connected to the electric system of the electronic device (26).

15. A system for analysing a Raman spectrum comprising:
an apparatus (25) in accordance with any one of the preceding items,
a detector (14), in particular an imaging sensor of an external device (26), for detecting a portion of the spatially separated wavelength components of the scattered light from a sample,
an electronic device (28), preferably a smartphone, a computer, a laptop or a tablet, being operatively connected, in particular by a wired or wireless connection, to the detector (14),
the electronic device (28) being adapted to receive or read out data associated with the detected spatially separated wavelength components (17) from the detector (14), and the electronic device (28) having a storage on which reference spectra of a plurality of materials are stored or having access to such reference spectra, and, preferably, the electronic device (28) being adapted to determine whether the detected spatially separated wavelength components of the scattered light matches with one of the reference spectra.

16. An apparatus for carrying out Raman spectroscopy on a sample (5), the apparatus comprising:
    a light source (1) for providing a beam of excitation radiation, and
    an optical system (101) providing an optical light path for directing the beam (15) of excitation radiation to the sample (5) and for directing a beam (16) of scattered light from the sample (5) to a detector (14),
    the optical system (101) comprising a spectrograph (8),
    the spectrograph (8) comprising a grating (12), in particular a transmission grating, adapted to divide the beam (16) of scattered light into a spectrum of spatially separated wavelength components (17) and to direct at least a portion of the spectrum to the detector (14),
    the spectrograph (8) comprising a first lens system (13) in the light path between the grating (12) and the detector (14) for focusing the portion of the spectrum onto the detector (14),
    the first lens system (13) having a high numerical aperture,
    the optical system (101) comprising at least a second lens system (103) in the light path between the light source (1) and the sample (5), and
    the second lens system (103) having a low numerical aperture.

17. The apparatus of item 16,
    characterized in that
    the second lens system (103) is adapted to focus the beam (15) of excitation radiation coming from the light source (1) to a first focal point (105) in the light path between the light source (1) and the sample (5), or
    in case a Wollaston prism (141) is arranged between the light source (1) and the second lens system (103), the second lens system (103) is adapted to focus a beam (15a) of excitation radiation coming from the Wollaston prism (141) to the first focal point (105a) and to focus a further beam (15b) of excitation radiation coming from the Wollaston prism (141) to a further focal point (105b) shifted in a focal plane with regard to the first focal point (105a).

18. The apparatus of any one of the items 16 to 17,
    characterized in that
    the numerical aperture of the second lens system (103) is in the range of 0.03 and 0.20, in particular in the range of 0.05 and 0.11, and/or
    the ratio between the numerical aperture of the first lens system (13) and the numerical aperture of the second lens system (103) is in the range between 1.8 and 10, preferably between 2.4 and 10, further preferably between 4 and 7.

19. The apparatus of any one of the items 16 to 18,
    characterized in that
    the optical system (101) comprises at least a third lens system (109) in the light path between the light source (1) and the sample (5),
    the third lens system (109) having a low numerical aperture.

20. The apparatus of any one of the items 16 to 19,
    characterized in that
    a third lens system (109) of the optical system (101) is arranged in the light path between the second lens system (103) and the sample (5) such that a focal point of the third lens system is located at least approximately at the first focal point (105).

21. The apparatus of any one of the items 16 to 20,
    characterized in that
    the optical system (101) comprises a fourth lens system (111), in particular a focusing lens, arranged in the optical path between the third lens system (109) and the sample (5), the fourth lens system (111) being configured to focus the beam (15) of excitation radiation on a second focal point (113) which defines the location for positioning the sample (5).

22. The apparatus of any one of the items 16 to 21,
    characterized in that
    a reference sample (107) is arranged at the first focal point (105) or, in case of the Wollaston prism (141) being present between the light source (1) and the second lens system (103), the reference sample (107) being located at the further focal point (105b) but not in the first focal point (105a).

23. The apparatus of any one of the items 16 to 22,
    characterized in that
    the optical path in between the second lens system (103) and a third lens system (109) comprises two mirrors (115, 117) for reflecting the beam (15) of excitation radiation traveling towards the sample (5), wherein the mirrors (115, 117) are arranged such that the beam (15) of excitation radiation travels through the second lens system (103) in a first direction and through the third lens system (109) in a second direction which is at least approximately antiparallel to the first direction.

24. The apparatus of any one of the items 16 to 23,
    characterized in that
    a beam splitting element, in particular a dichroic beam splitter (3), is arranged between the light source (1) and the second lens system (103), the beam splitting element being adapted to reflect the beam (15) of excitation radiation incoming from the light source (1) and to direct it toward the second lens system (103), and/or
    the beam splitting element being designed that the beam (16) of scattered light traveling from the sample (5) in the optical system (101) can pass through the beam splitting element.

25. The apparatus of item 24,
    characterized in that
    the beam splitting element is arranged in the light path between the second lens system (103) and the spectrograph (8).

26. An apparatus for carrying out Raman spectroscopy on a sample (5), in particular in accordance with any one of the items 16 to 25,
    the apparatus comprising:
    a light source (1) for providing a beam (15) of excitation radiation, and
    an optical system (101) providing an optical light path for directing the beam (15) of excitation radiation to the sample (5) and for directing a beam (16) of scattered light from the sample (5) to a detector (14),
    the optical system (101) comprising a spectrograph (8),
    the spectrograph (8) comprising a grating (12), in particular a transmission grating, adapted to divide the beam (16) of scattered light into a spectrum of spatially separated wavelength components (17) and to direct at least a portion of the spectrum to the detector (14), the spectrograph (8) comprising a first lens system (13) in the light path between the grating (12) and the detector (14) for focusing the portion of the spectrum onto the detector (14),
preferably the first lens system (13) having a high numerical aperture,
the optical system comprising at least a second lens system (103), in particular in the light path between the light source (1) and the sample (5),
preferably the second lens system (103) having a low numerical aperture, and
the second lens system (103) providing a first focal point (105) in the optical path for focusing the beam (15) of excitation radiation and/or the beam (16) of scattered radiation at the first focal point (105), and
the apparatus comprising a reference sample (107) arranged at the first focal point (105) for obtaining a reference spectrum from the reference sample (107).

27. A portable electronic device, in particular a smartphone (121) or a tablet,
comprising:
a digital camera, and
an apparatus in accordance with any one of the items 16 to 26, the apparatus being adapted to be attached to a housing of the portable device (121) such that the digital camera serves as the detector.

28. The electronic device of item 27,
characterized in that
the electronic device (121) is configured to calibrate the portion of the spectrum of the sample detected by the digital camera based on at least one spectral line from a reference sample (107).

29. The electronic device of item 27 or 28,
characterized in that
the electronic device comprises a display (127) and is configured to display the calibrated portion of the spectrum on the display (127).

30. The electronic device of any one of the items 27 to 29,
characterized in that
the apparatus comprises a housing (119) which has at least in substance the same length and width as the housing of the electronic device (121).

31. An apparatus for carrying out Raman spectroscopy on a sample (5), the apparatus comprising:
a light source (1) for providing a beam (15) of excitation radiation, and
an optical system (101) providing an optical light path for directing the beam (15) of excitation radiation to the sample (5) and for directing a beam (16) of scattered light from the sample (5) to a detector (14),
the optical system (101) comprising a spectrograph (8),
the spectrograph (8) comprising a grating (12), in particular a transmission grating, adapted to divide the beam (16) of scattered light into a spectrum of spatially separated wavelength components (17) and to direct at least a portion of the spectrum to the detector (14),
the spectrograph (8) comprising a first lens system (13) in the light path between the grating (12) and the detector (14) for focusing the portion of the spectrum onto the detector (14),
the first lens system (13) having a high numerical aperture,
the optical system (101) comprising at least a second lens system (103) in the light path between the light source (1) and the sample (5) or in the light path between the sample (5) and the grating (12), and
the second lens system (103) having a low numerical aperture.

32. The apparatus of item 31,
characterized in that
the second lens system (103) being configured to provide a first focal plane with at least a first focal point (105, 105a, 105b) in the light path between the light source (1) and the sample (5) and/or in the light path between the sample (5) and the detector (14), and/or
that a polarization selective element, for example a Wollaston prism (141), is arranged in the optical system (101) for splitting the beam (15) of excitation radiation into two beams (15a, 15b) of excitation radiation with orthogonal polarization.

33. The apparatus of item 31 or 32,
characterized in that
the second lens system (103) is arranged either in the light path between a beam splitting element (3), for example a dichroic beam splitter or a dichroic mirror, and the sample (5) or in the light path between the beam splitting element (3) and the detector (14),
wherein, preferably, the beam splitting element (3) is configured to be either reflective for the beam of excitation radiation (15, 15a, 15b) and light-transmissive for at least a portion of the beam (16) of scattered light, or light-transmissive for the beam of excitation radiation (15, 15a, 15b) and reflective for at least a portion of the beam (16) of scattered light,
wherein, preferably, the second lens system (103) is adapted to have a first focal point (105a, 105b) on a surface of a beam splitting element (3), the surface comprising a coating, in particular a metal coating, the coating preferably forming a slit.

34. The apparatus of any one of the items 31-33,
characterized in that
the second lens system (103) is adapted to focus the beam (15) of excitation radiation coming from the light source (1) to a first focal point (105) in the light path between the light source (1) and the sample (5), or
in case a Wollaston prism (141) is arranged between the light source (1) and the second lens system (103), the second lens system (103) is adapted to focus a beam (15a) of excitation radiation coming from the Wollaston prism (141) to the first focal point (105a) and to focus a further beam (15b) of excitation radiation coming from the Wollaston prism (141) to a further focal point (105b) shifted in a focal plane with regard to the first focal point (105a).

35. The apparatus of any one of the items 31-34,
characterized in that
the second lens system (103) is adapted to transform the beam (16) of scattered light into a collimated beam for illumination of the grating (12).

36. The apparatus of any one of the items 31-35,
characterized in that
the numerical aperture of the second lens system (103) is in the range of 0.03 and 0.20, in particular in the range of 0.05 and 0.11, and/or the ratio between the numerical aperture of the first lens system (13) and the numerical aperture of the second lens system (103) is in the range between 1.8 and 10, preferably between 2.4 and 10, further preferably between 4 and 7.

37. The apparatus of any one of the items 31-36,
characterized in that
the optical system (101) comprises at least a third lens system (109) in the light path between the light source (1) and the sample (5), the third lens system (109) having a low numerical aperture.
38. The apparatus of any one of the items 31-37, characterized in that
    a third lens system (109) of the optical system (101) is arranged in the light path between the second lens system (103) and the sample (5) such that a focal point of the third lens system is located at least approximately at the first focal point (105),
    wherein, preferably, the third lens system (109) is adapted to have the focal point on a surface of a beam splitting element (3), the surface comprising a coating, in particular a metal coating, the coating preferably forming a slit.
39. The apparatus of item 37 or 38, characterized in that
    a slit (107*a*) is arranged in between the second lens system (103) and the third lens system (109), wherein a focal plane of the second lens system (103) and a focal plane of the third lens system (109) is located, at least approximately, in the slit (107*a*),
    wherein, preferably, a reference sample (107) is arranged in or before at least a portion of the slit (107*a*),
    wherein, preferably, the slit (107*a*) is formed by use of a coating, in particular a metal coating, on a surface of a beam splitting element (3).
40. The apparatus of any one of the items 31-39, characterized in that
    the optical system (101) comprises a fourth lens system (111), in particular a focusing lens, arranged in the optical path between a third lens system (109) and the sample (5), the fourth lens system (111) being configured to focus the beam (15) of excitation radiation on a second focal point (113) which defines the location for positioning the sample (5).
41. The apparatus of any one of the items 32 to 40, characterized in that
    a reference sample (107) is arranged at the first focal point (105) or, in case of the Wollaston prism (141) being present between the light source (1) and the second lens system (103), the reference sample (107) being located at the further focal point (105*b*) but not in the first focal point (105*a*).
42. The apparatus of any one of the items 31 to 41, characterized in that
    the optical path in between the second lens system (103) and a third lens system (109) comprises two mirrors (115, 117) for reflecting the beam (15) of excitation radiation traveling towards the sample (5),
    wherein the mirrors (115, 117) are arranged such that the beam (15) of excitation radiation travels through the second lens system (103) in a first direction and through the third lens system (109) in a second direction which is at least approximately antiparallel to the first direction.
43. The apparatus of any one of the items 31-42, characterized in that
    a beam splitting element, in particular a dichroic beam splitter (3), is arranged between the light source (1) and the second lens system (103), wherein, preferably, the beam splitting element is adapted to reflect the beam (15) of excitation radiation incoming from the light source (1) and to direct it toward the second lens system (103), and/or
    wherein, preferably, the beam splitting element is designed that the beam (16) of scattered light traveling from the sample (5) in the optical system (101) can pass through the beam splitting element.
44. The apparatus of item 43, characterized in that
    the beam splitting element (13) is arranged in the light path between the second lens system (103) and the spectrograph (8), or
    the beam splitting element (13) is arranged in the light path between the second lens system (103) and a third lens system (109).
45. An apparatus for carrying out Raman spectroscopy on a sample (5), in particular in accordance with any one of the items 31-44,
    the apparatus comprising:
        a light source (1) for providing a beam (15) of excitation radiation, and
        an optical system (101) providing an optical light path for directing the beam (15) of excitation radiation to the sample (5) and for directing a beam (16) of scattered light from the sample (5) to a detector (14),
        the optical system (101) comprising a spectrograph (8),
        the spectrograph (8) comprising a grating (12), in particular a transmission grating, adapted to divide the beam (16) of scattered light into a spectrum of spatially separated wavelength components (17) and to direct at least a portion of the spectrum to the detector (14),
        the spectrograph (8) comprising a first lens system (13) in the light path between the grating (12) and the detector (14) for focusing the portion of the spectrum onto the detector (14),
        preferably the first lens system (13) having a high numerical aperture,
        the optical system comprising at least a second lens system (103), in particular in the light path between the light source (1) and the sample (5),
        preferably the second lens system (103) having a low numerical aperture, and
        the second lens system (103) providing a first focal point (105) in the optical path for focusing the beam (15) of excitation radiation and/or the beam (16) of scattered radiation at the first focal point (105), and
        the apparatus comprising a reference sample (107) arranged at the first focal point (105) for obtaining a reference spectrum from the reference sample (107).
46. A portable electronic device, in particular a smartphone (121) or a tablet, comprising:
        a digital camera, and
        an apparatus in accordance with any one of the items 31-45, the apparatus being adapted to be attached to a housing of the portable device (121) such that the digital camera serves as the detector.
47. The electronic device of item 46, characterized in that
    the electronic device (121) is configured to calibrate the portion of the spectrum of the sample (5) detected by the digital camera based on at least one spectral line from a reference sample (107).
48. The electronic device of item 46 or 47, characterized in that
    the electronic device comprises a display (127) and is configured to display the calibrated portion of the spectrum on the display (127).
49. The electronic device of any one of the items 46 to 48, characterized in that the apparatus comprises a housing (119) which has at least in substance the same length and width as the housing of the electronic device (121), or the electronic device (26) comprises a housing (35) which has a compartment for receiving the apparatus.

LIST OF REFERENCE NUMERALS 1 light source, laser
2 interference filter
3 dichroic mirror, dichroic beamsplitter
4 lens arrangement, objective
5 sample
6 first edge filter
7 slit lens
8 spectrograph
9 slit
10 collimation lens
11 second edge filter
12 transmission grating
13 focusing lens, first lens system
14 imaging sensor
15 laser beam
15a laser beam
15b laser beam
16 scattered light beam
16a scattered light beam
16b scattered light beam
17 wavelengths components
18 housing
19 lens arrangement
20 mirror
21 mirror
22 sample wheel
23 electronics
24 housing
25 apparatus
26 external device, smartphone
27 system
28 electronic device, smartphone
29 wireless connection
30 aperture
31 spectrum from sample
32 spectrum from calibration sample
33 calibration sample
34 mirror
35 housing
36 electrical connector
37 lens
38 lens
39 lens
40 lens
41 lens
42 lens
43 lens
44 lens
101 optical system
103 second lens system
105 first focal point
105a first focal point
105b first focal point
107 reference sample
107a slit
109 third lens system
111 fourth lens system
113 second focal point
115 mirror
117 mirror
119 housing
121 smartphone
123 upper side
125 opening
127 display
131 detected Raman spectrum of Polystyrene
133 detected Raman spectrum of Polypropylene
135 detected Raman spectrum of Paracetamol
137 detected Raman spectrum of Indomethacin
139 detected Raman spectrum of Nitrofurantoin
141 Wollaston prism
143 lens
145 filter
147 lens
149 filter
151 housing
152 Raman spectroscopy apparatus
153 housing
155 mirror
157 coating
161 aperture
163 aperture
165 second coating
A rotational axis
OA optical axis
L1 length
L2 length
L3 length
W1 width
W2 width
H height

The invention claimed is:

1. An apparatus for carrying out Raman spectroscopy on a sample, the apparatus comprising:

a light source for providing a beam of excitation radiation; and an optical system that provides a first beam of excitation radiation and a second beam of excitation radiation, wherein the first beam of excitation radiation and the second beam of excitation radiation travel along different directions, and wherein the optical system provides an optical light path for directing the first beam of excitation radiation to a sample and for directing a first beam of scattered light from the sample to a detector and for directing the second beam of excitation radiation to a reference sample and for directing a second beam of scattered light from the reference sample to the detector, wherein the first beam of scattered light and the second beam of scattered light travel along at different directions, the optical system comprising:

a spectrograph comprising:

a grating adapted to divide the first beam of scattered light from the sample into a spectrum of spatially separated wavelength components and to direct a portion of the spectrum from the sample to the detector; and a first lens system in a first light path between the grating and the detector for focussing the portion of the spectrum from the sample onto a first area of the detector, wherein the grating is further adapted to divide the second beam of scattered light from the reference sample into a reference spectrum of spatially separated wavelength components and to direct a portion of the reference spectrum from the reference sample to the detector, wherein the first lens system is adapted to focus the portion of the spectrum from the sample onto a second area of the detector, wherein the second area is different from the first area;

wherein the optical system comprises a second lens system in a second light path between the light source and the sample, wherein the second lens system focusses the second beam of excitation radiation to a first focal point in a focal plane wherein the reference sample is placed and the second lens system focusses the first beam of excitation radiation to a second focal point in the focal plane, wherein the first beam of excitation radiation focused at the second focal point avoids the reference sample;

wherein the optical system comprises a beam splitter configured to be reflective for the first beam of excitation radiation and light-transmissive for at least a portion of the first beam of scattered light, wherein the beam splitter comprises a surface and the reference sample is arranged on the surface of the beam splitter.

2. The apparatus of claim 1, wherein the reference sample is polystyrene.

3. The apparatus of claim 1, wherein the optical system further comprises a polarization splitter that is arranged in the optical system to split the beam of excitation radiation into the first beam of excitation radiation with a first polarization and the second beam of excitation radiation with a second polarization that is orthogonal to the first polarization.

4. The apparatus of claim 1, wherein the second lens system provides the focal plane in the second light path between the light source and the sample and/or in a third light path between the sample and the detector.

5. The apparatus of claim 1, wherein a Wollaston prism is arranged between the light source and the second lens system; and
wherein the second lens system is adapted to focus the first beam of excitation radiation coming from the Wollaston prism to the focal point and to focus the second beam of excitation radiation coming from the Wollaston prism to a second focal point shifted in the focal plane relative to the focal point.

6. The apparatus of claim 1, wherein the optical system comprises a third lens system that is arranged in a third light path between the second lens system and the sample such that a second focal plane of the third lens system at least approximately matches with the focal plane of the second lens system, wherein a third focal point of the third lens system is located at least approximately at the first focal point.

7. The apparatus of claim 1, wherein the reference sample is arranged at the first focal point.

8. The apparatus of claim 1, wherein a third-optical path in between the second lens system and a third lens system comprises at least one mirror for reflecting the first beam of excitation radiation traveling towards the sample, wherein the at least one mirror is arranged such that the first beam of excitation radiation travels through at least one lens of the second lens system in a first direction and through the third lens system in a second direction which is at least approximately antiparallel to the first direction.

9. The apparatus of claim 1, further comprising a slit arranged in the focal plane through which the first beam of excitation radiation, the second beam of excitation radiation, the first beam of scattered light, and the second beam of scattered light pass through.

10. The apparatus of claim 1, wherein the sample receives the first beam of excitation radiation and the second beam of scattered light.

11. The apparatus of claim 1, wherein the beam of scattered light from sample and the Raman spectrum of the reference sample are detectable on the first area of the detector and the second area of the detector, respectively, simultaneously.

12. An apparatus for carrying out Raman spectroscopy on a sample, the apparatus comprising:
a light source for providing a beam of excitation radiation; and
an optical system that provides a first beam of excitation radiation and a second beam of excitation radiation, wherein the first beam of excitation radiation and the second beam of excitation radiation travel along different directions, and wherein the optical system provides an optical light path for directing the first beam of excitation radiation to a sample and for directing a first beam of scattered light from the sample to a detector and for directing the second beam of excitation radiation to a reference sample and for directing a second beam of scattered light from the reference sample to the detector, wherein the first beam of scattered light and the second beam of scattered light travel along at different directions, the optical system comprising:
a spectrograph comprising:
a grating adapted to divide the first beam of scattered light from the sample into a spectrum of spatially separated wavelength components and to direct a portion of the spectrum from the sample to the detector; and
a first lens system in a first light path between the grating and the detector for focussing the portion of the spectrum from the sample onto a first area of the detector, wherein the grating is further adapted to divide the second beam of scattered light from the reference sample into a reference spectrum of spatially separated wavelength components and to direct a portion of the reference spectrum from the reference sample to the detector, wherein the first lens system is adapted to focus the portion of the spectrum from the sample onto a second area of the detector, wherein the second area is different from the first area;
wherein the optical system comprises a second lens system in a second light path between the light source and the sample, wherein the second lens system focusses the second beam of excitation radiation to a first focal point in a focal plane wherein the reference sample is placed and the second lens system focusses the first beam of excitation radiation to a second focal point in the focal plane, wherein the first beam of excitation radiation focused at the second focal point avoids the reference sample;
wherein the optical system comprises a beam splitter configured to be reflective for the first beam of excitation radiation and light-transmissive for at least a portion of the first beam of scattered light, further comprising a slit arranged on a surface of the beam splitter, wherein the surface comprises a coating that forms the slit.

13. An apparatus for carrying out Raman spectroscopy on a sample, the apparatus comprising:
a light source for providing a beam of excitation radiation; and an optical system that provides a first beam of excitation radiation and a second beam of excitation radiation, wherein the first beam of excitation radiation and the second beam of excitation radiation travel along different directions, and wherein the optical system provides an optical light path for directing the first beam of excitation radiation to a sample and for directing a first beam of scattered light from the sample to a detector and for directing the second beam of excitation radiation to a reference sample and for directing a second beam of scattered light from the reference sample to the detector, wherein the first beam of scattered light and the second beam of scattered light travel along at different directions, the optical system comprising:
a spectrograph comprising:
  a grating adapted to divide the first beam of scattered light from the sample into a spectrum of spatially separated wavelength components and to direct a portion of the spectrum from the sample to the detector; and
  a first lens system in a first light path between the grating and the detector for focussing the portion of the spectrum from the sample onto a first area of the detector, wherein the grating is further adapted to divide the second beam of scattered light from the reference sample into a reference spectrum of spatially separated wavelength components and to direct a portion of the reference spectrum from the reference sample to the detector, wherein the first lens system is adapted to focus the portion of the spectrum from the sample onto a second area of the detector, wherein the second area is different from the first area;
wherein the optical system comprises a second lens system in a second light path between the light source and the sample, wherein the second lens system focusses the second beam of excitation radiation to a first focal point in a focal plane wherein the reference sample is placed and the second lens system focusses the first beam of excitation radiation to a second focal point in the focal plane, wherein the first beam of excitation radiation focused at the second focal point avoids the reference sample;
wherein the optical system comprises a third lens system that is arranged in a third light path between the second lens system and the sample such that a second focal plane of the third lens system at least approximately matches with the focal plane of the second lens system, wherein a third focal point of the third lens system is located at least approximately at the first focal point; and
wherein a slit is arranged in between the second lens system and the third lens system, wherein the reference sample is arranged in or before at least a portion of the slit.

14. An apparatus for carrying out Raman spectroscopy on a sample the apparatus comprising:
a light source for providing a beam of excitation radiation; and
an optical system providing an optical light path for directing the beam of excitation radiation to a sample and for directing a beam of Raman scattered light from the sample to a detector, the optical system comprising:
a spectrograph comprising:
  a grating adapted to divide the beam of Raman scattered light into a spectrum of spatially separated wavelength components and to direct a portion of the spectrum to the detector; and
  a first lens system in a first light path between the grating and the detector for focussing the portion of the spectrum onto the detector;
wherein the optical system comprises a second lens system in a second light path between the light source and the sample, wherein the second lens system being configured to provide a focal plane to receive a first focal point in an optical path where the beam of excitation radiation is focussed and/or the second lens system being configured to provide the focal plane to receive a second focal point in the optical path where the beam of Raman scattered radiation is focussed at the first focal point; and
a reference sample arranged in the first focal plane for obtaining a reference spectrum from the reference sample,
wherein a Wollaston prism is arranged between the light source and the second lens system; and wherein the second lens system is adapted to focus a first beam of excitation radiation coming from the Wollaston prism to the first focal point and to focus a second beam of excitation radiation coming from the Wollaston prism to the second focal point shifted in the first focal plane relative to the focal point,
wherein the optical system comprises a beam splitter, wherein the beam splitter comprises a surface and the reference sample is arranged on the surface of the beam splitter,
wherein the first beam of excitation radiation focused at the first focal point does not pass through the reference sample and is reflected by the beam splitter and travels to the sample and the Raman scattered by the sample and travels through the beam splitter and is detected by the detector,
wherein the second beam of excitation radiation focused at the second focal point is not reflected by the beam splitter and is Raman scattered by the reference sample and travels to the spectrograph and is detected by the detector,
wherein the reference sample is selected from the group consisting of a reference sample coating arranged on the surface of the beam splitter and a hardened liquid material arranged on the surface of the beam splitter, and
wherein the reference sample comprises polystyrene, and the beam splitter is a dichroic beam splitter, wherein a slit is formed by two apertures in a coating of the beam splitter.

* * * * *